Jan. 16, 1968     D. E. DYKAAR ET AL     3,363,756

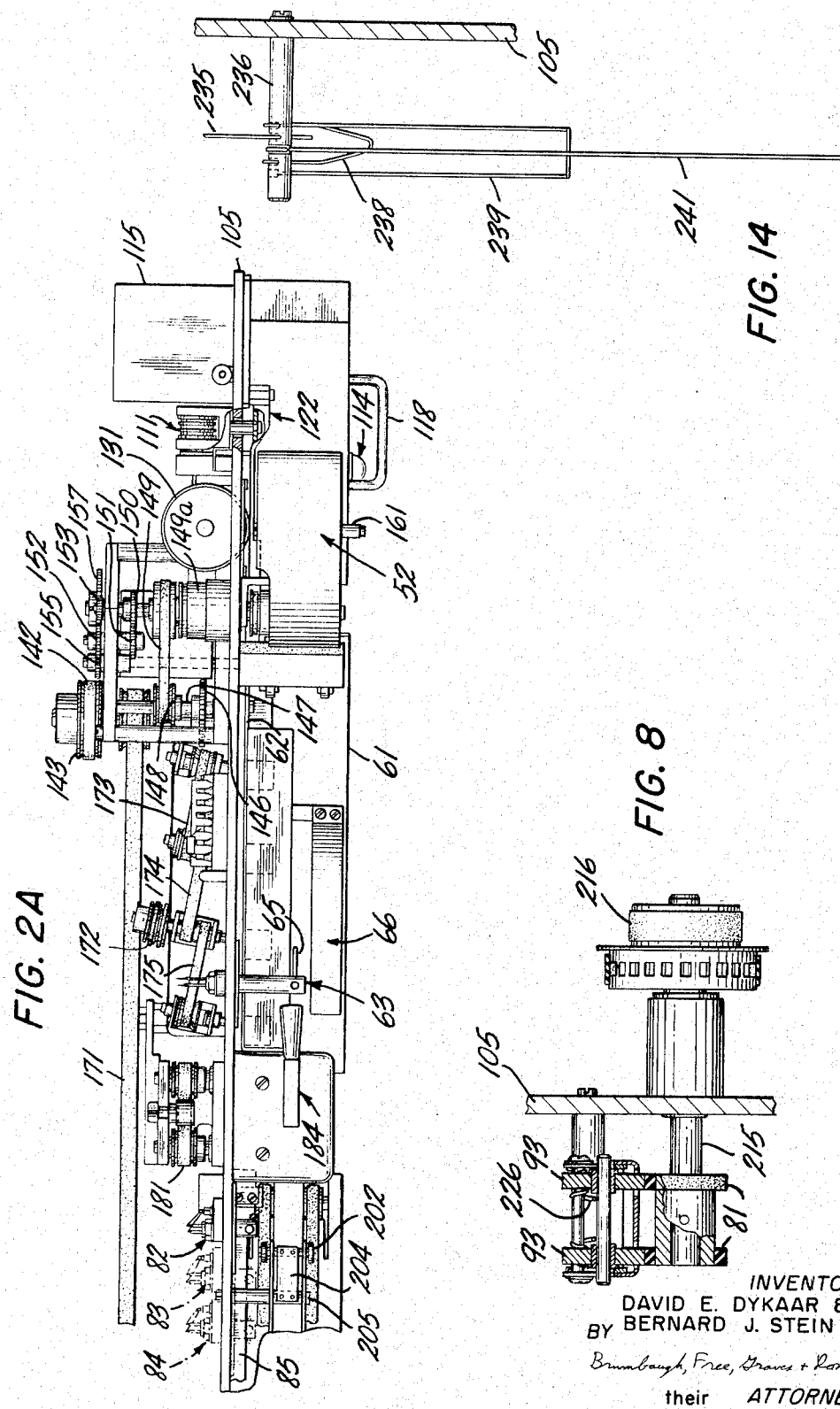

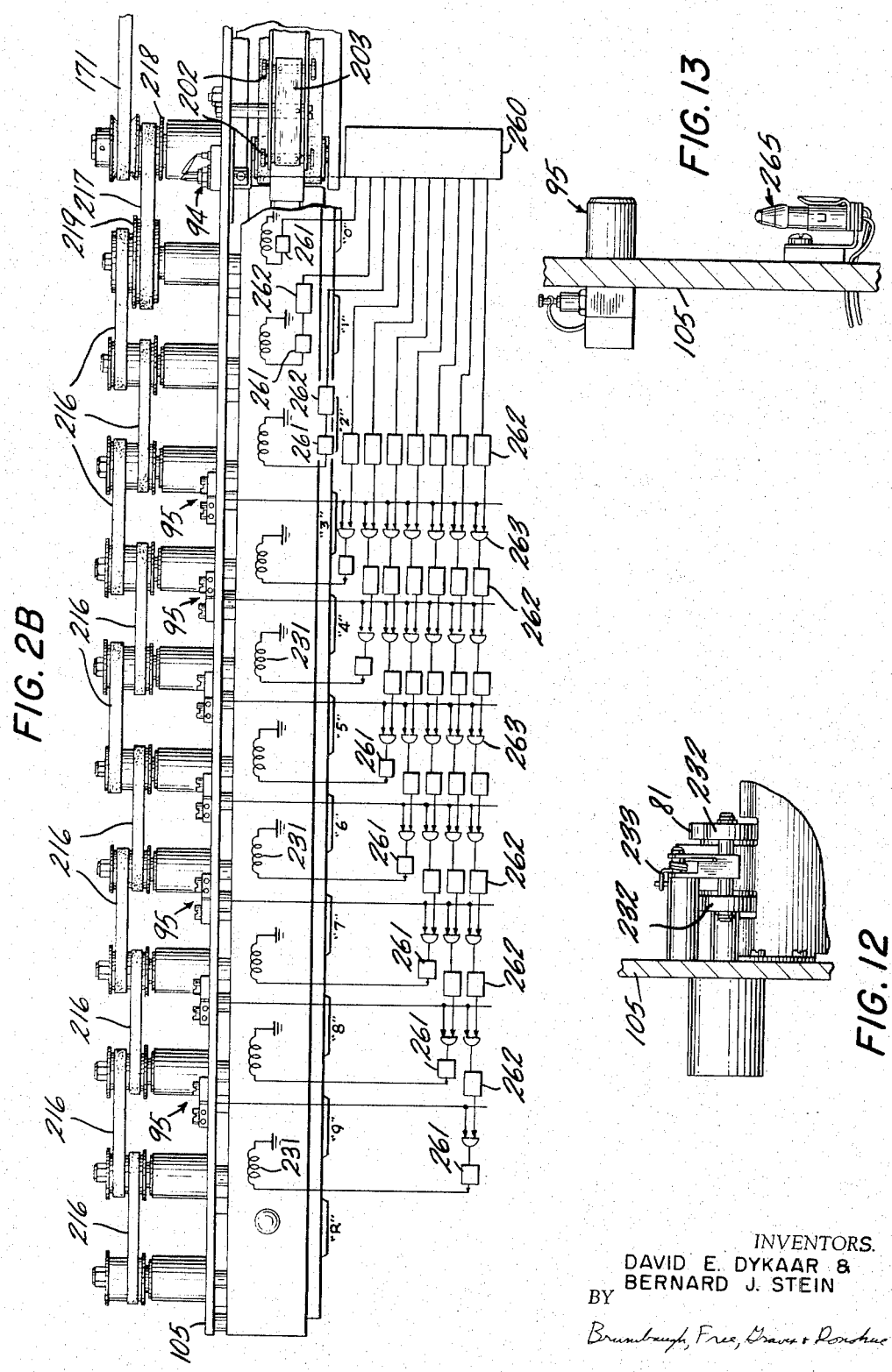

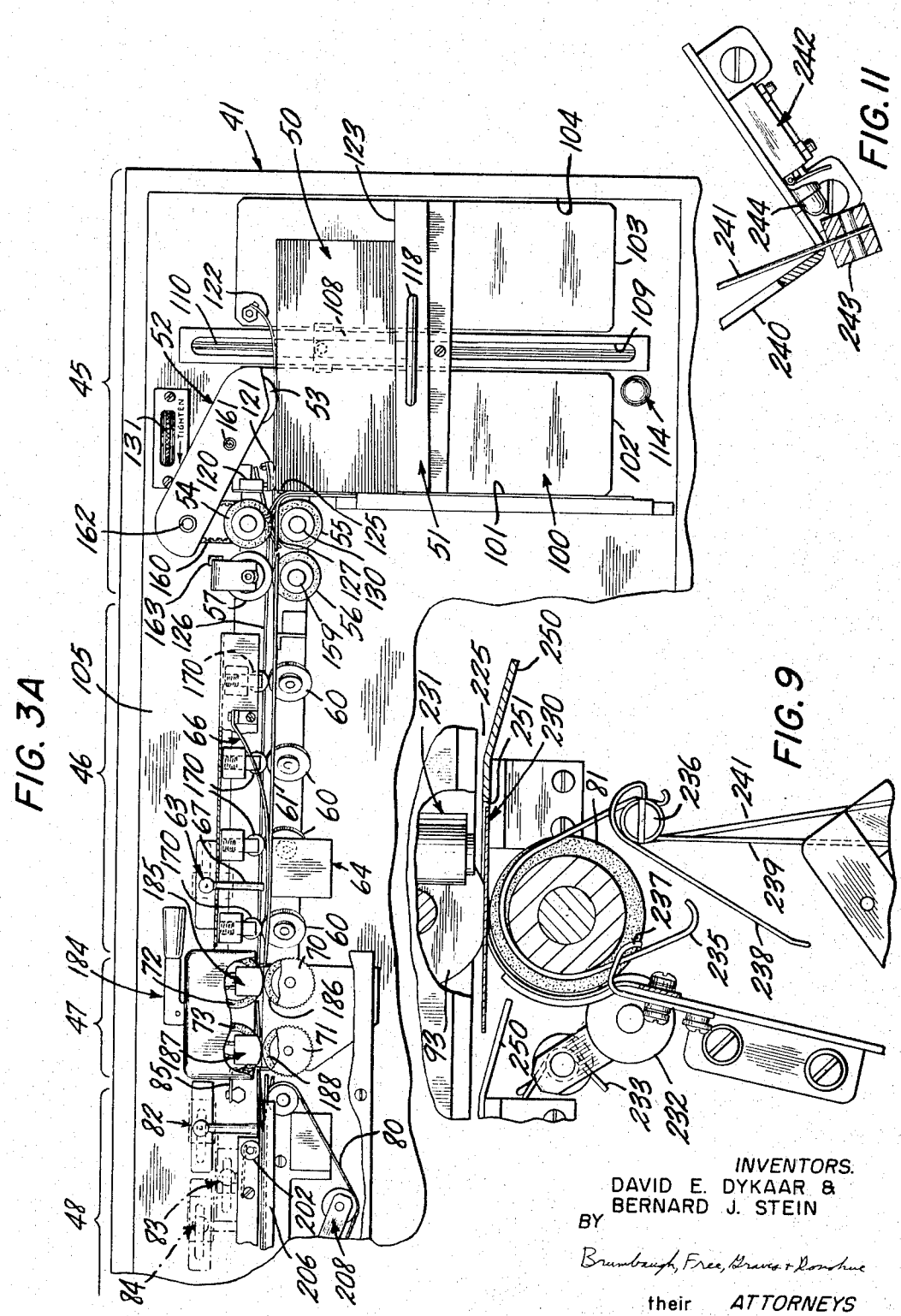

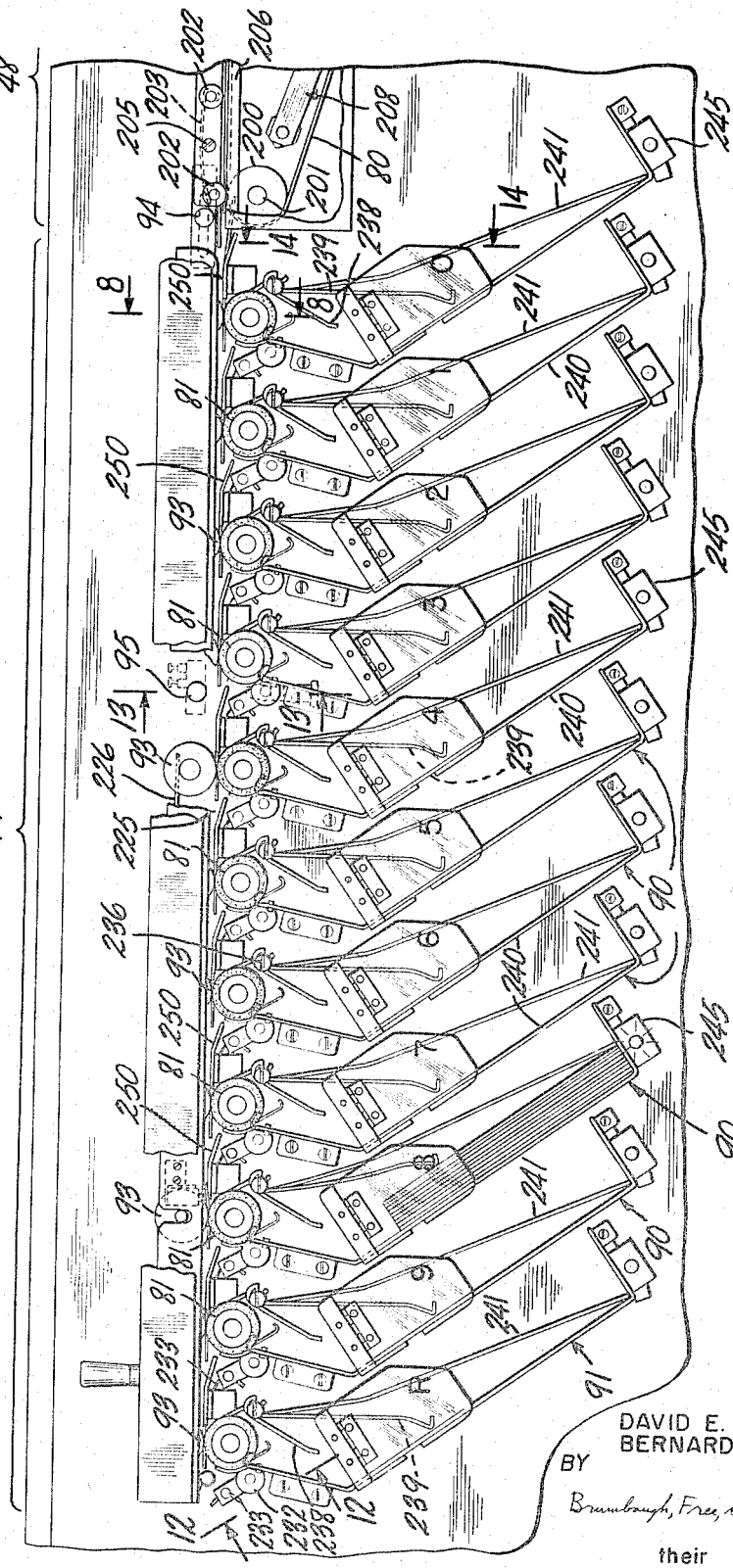

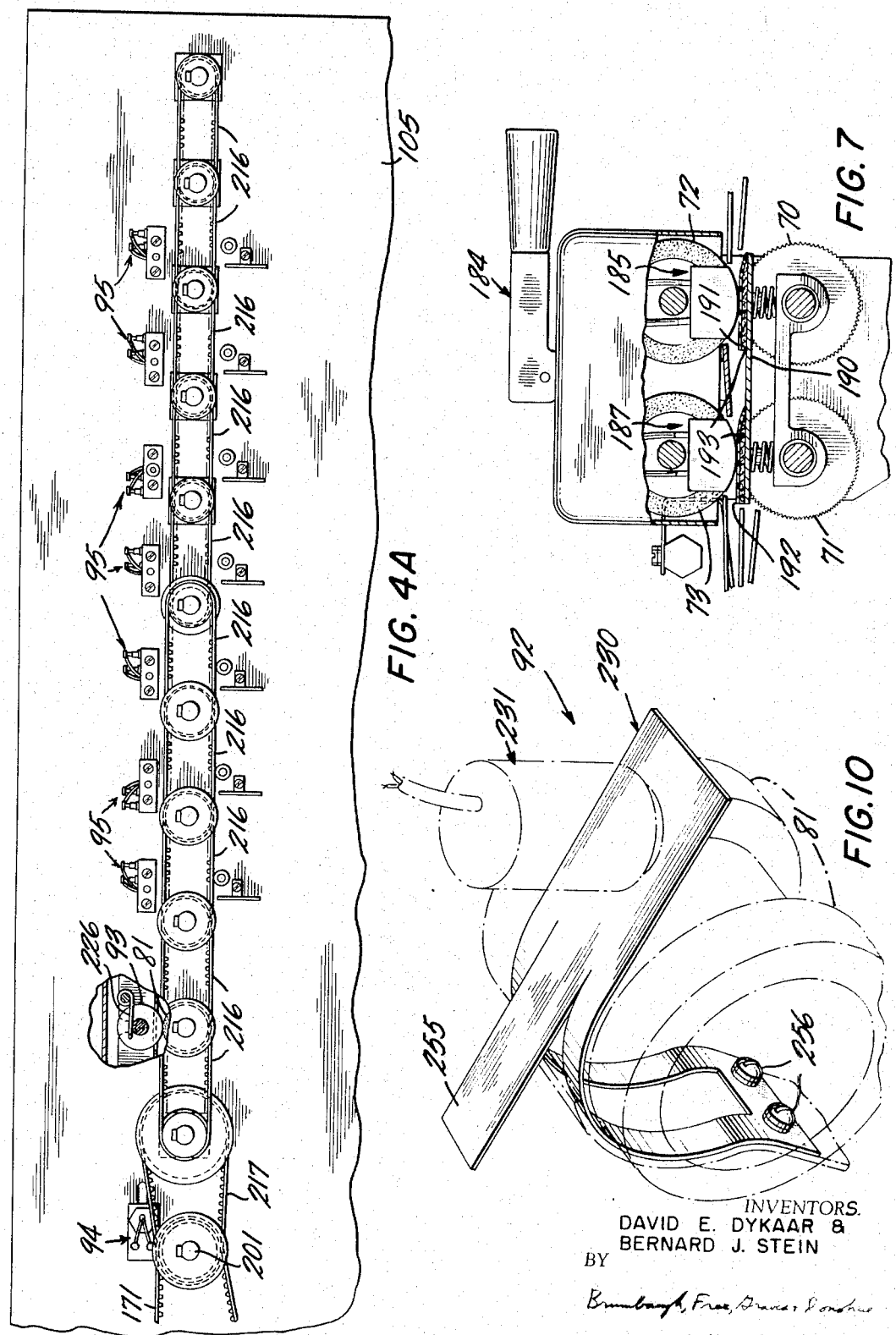

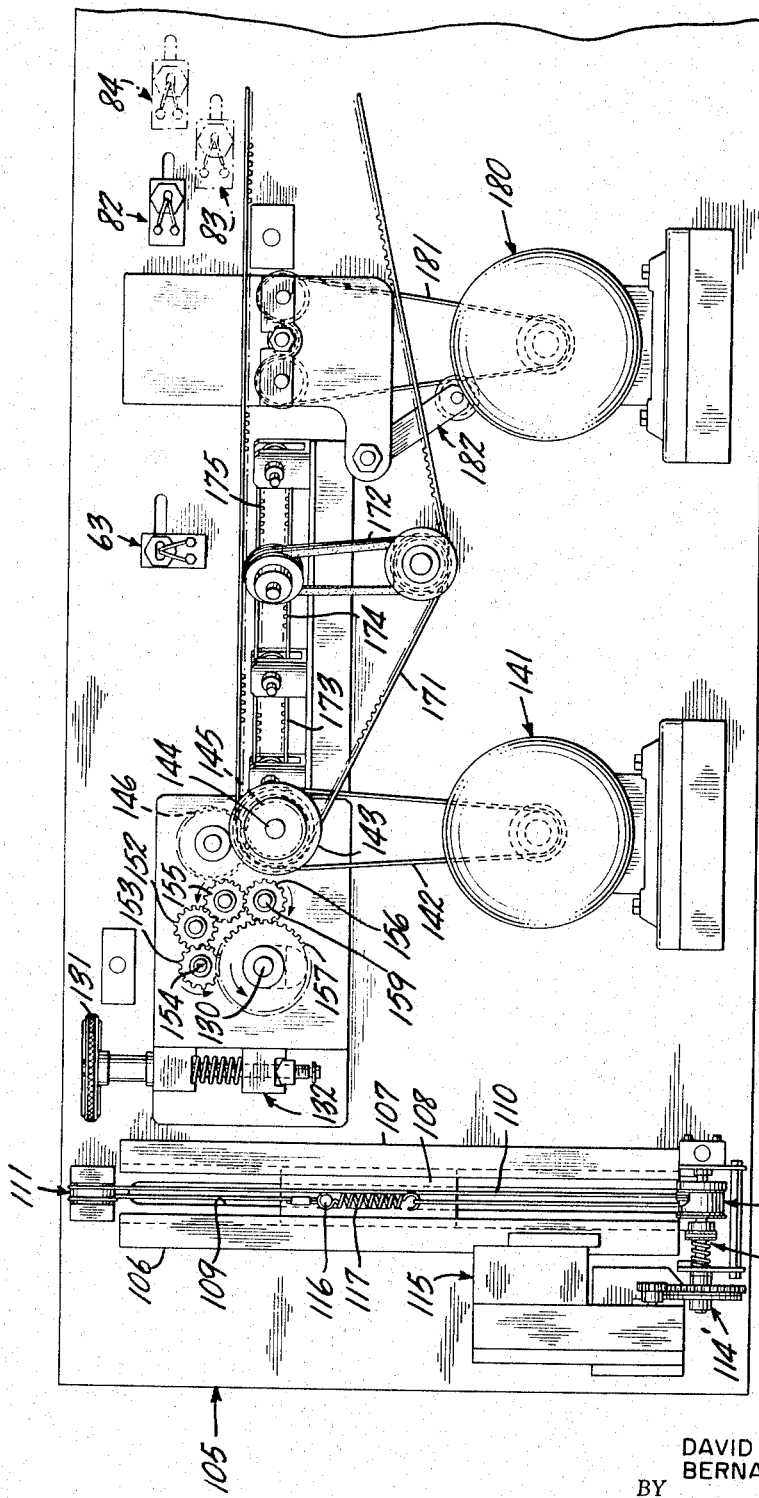

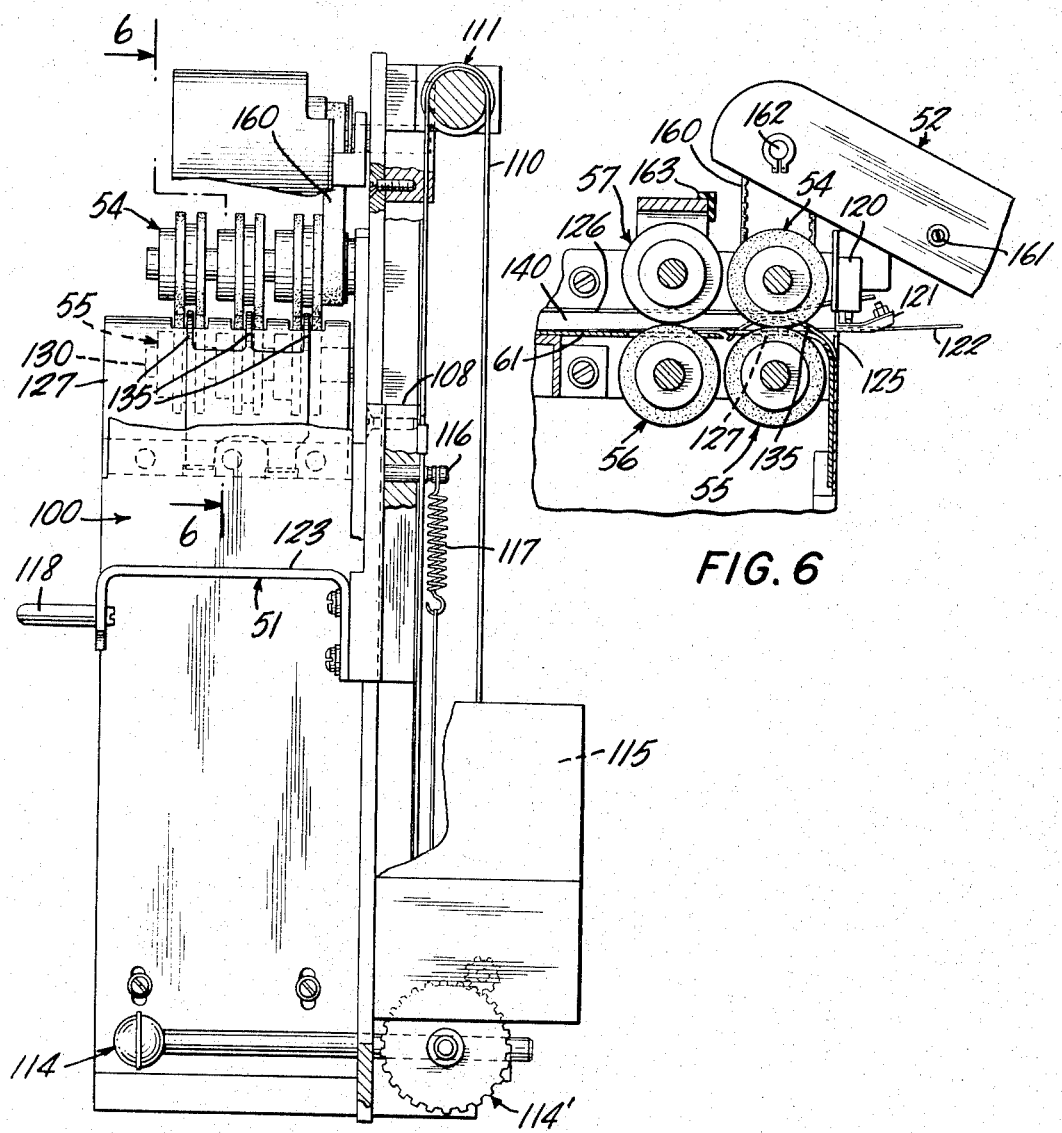

DOCUMENT HANDLING SYSTEM

Filed June 1, 1965     18 Sheets-Sheet 9

INVENTORS.
DAVID E. DYKAAR &
BERNARD J. STEIN

BY Brumbaugh, Free, Graves + Donohue their ATTORNEYS

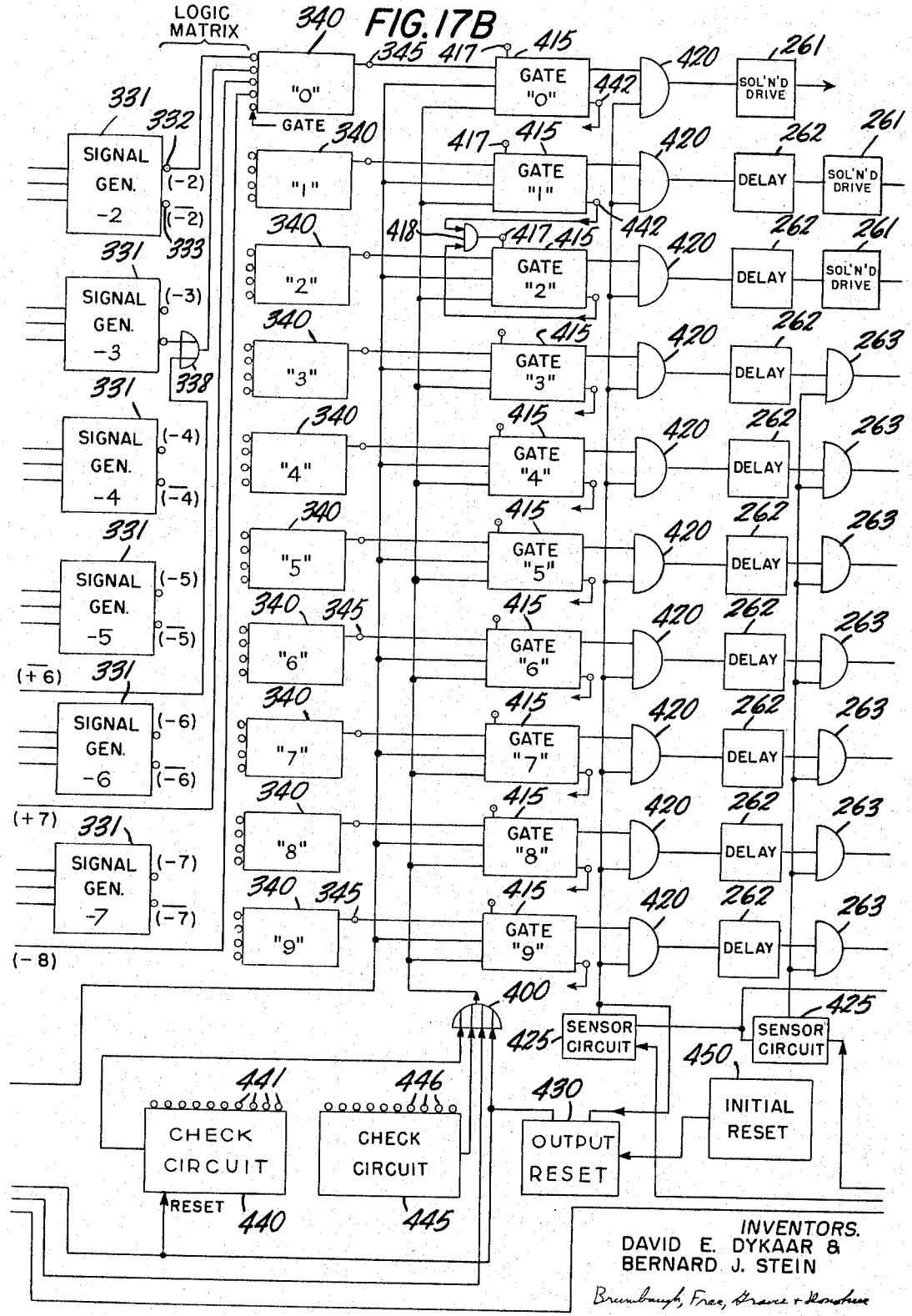

Jan. 16, 1968 D. E. DYKAAR ET AL 3,363,756
DOCUMENT HANDLING SYSTEM
Filed June 1, 1965 18 Sheets-Sheet 13

INVENTORS.
DAVID E. DYKAAR &
BY BERNARD J. STEIN their ATTORNEYS

Jan. 16, 1968  D. E. DYKAAR ET AL  3,363,756
DOCUMENT HANDLING SYSTEM
Filed June 1, 1965  18 Sheets-Sheet 14

INVENTORS.
DAVID E. DYKAAR &
BERNARD J. STEIN
BY
their ATTORNEYS

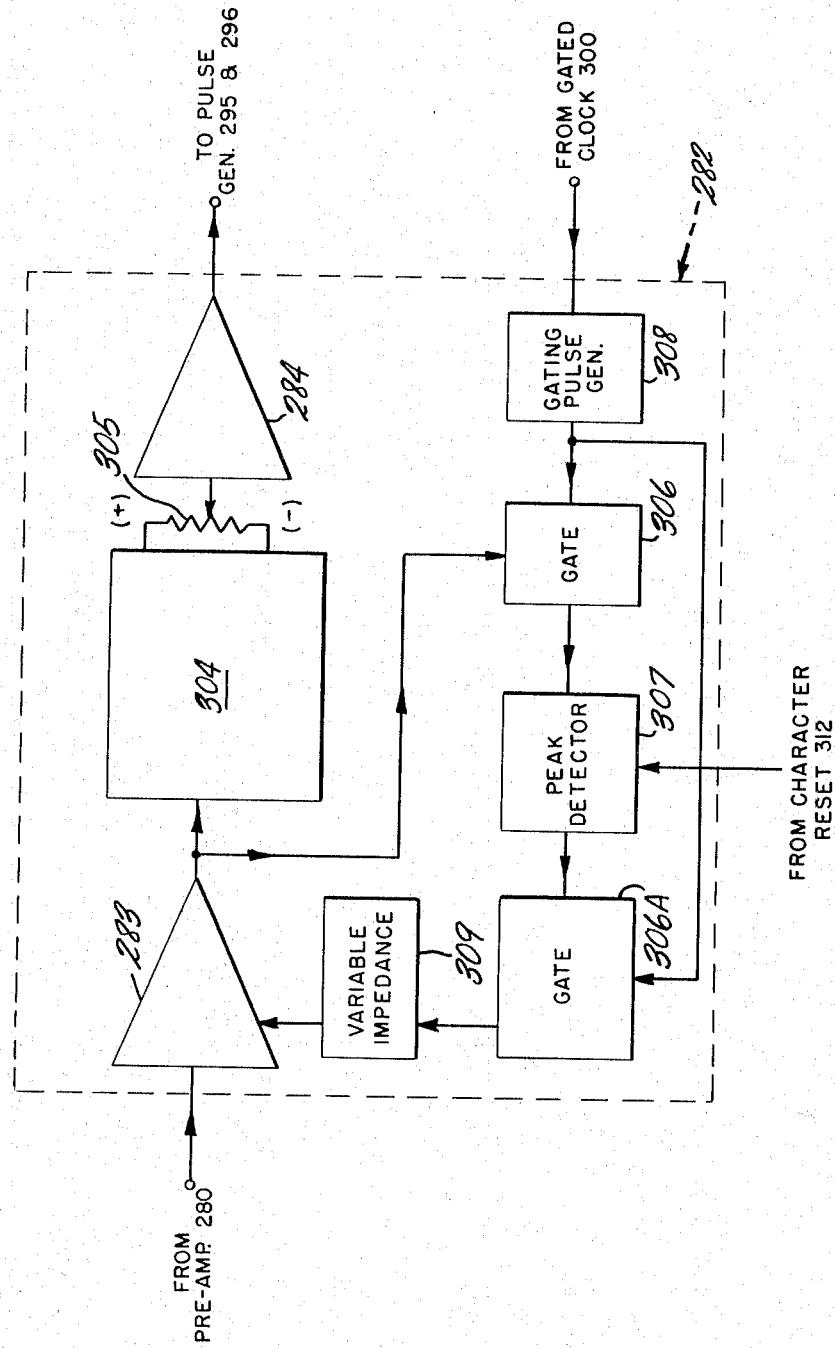

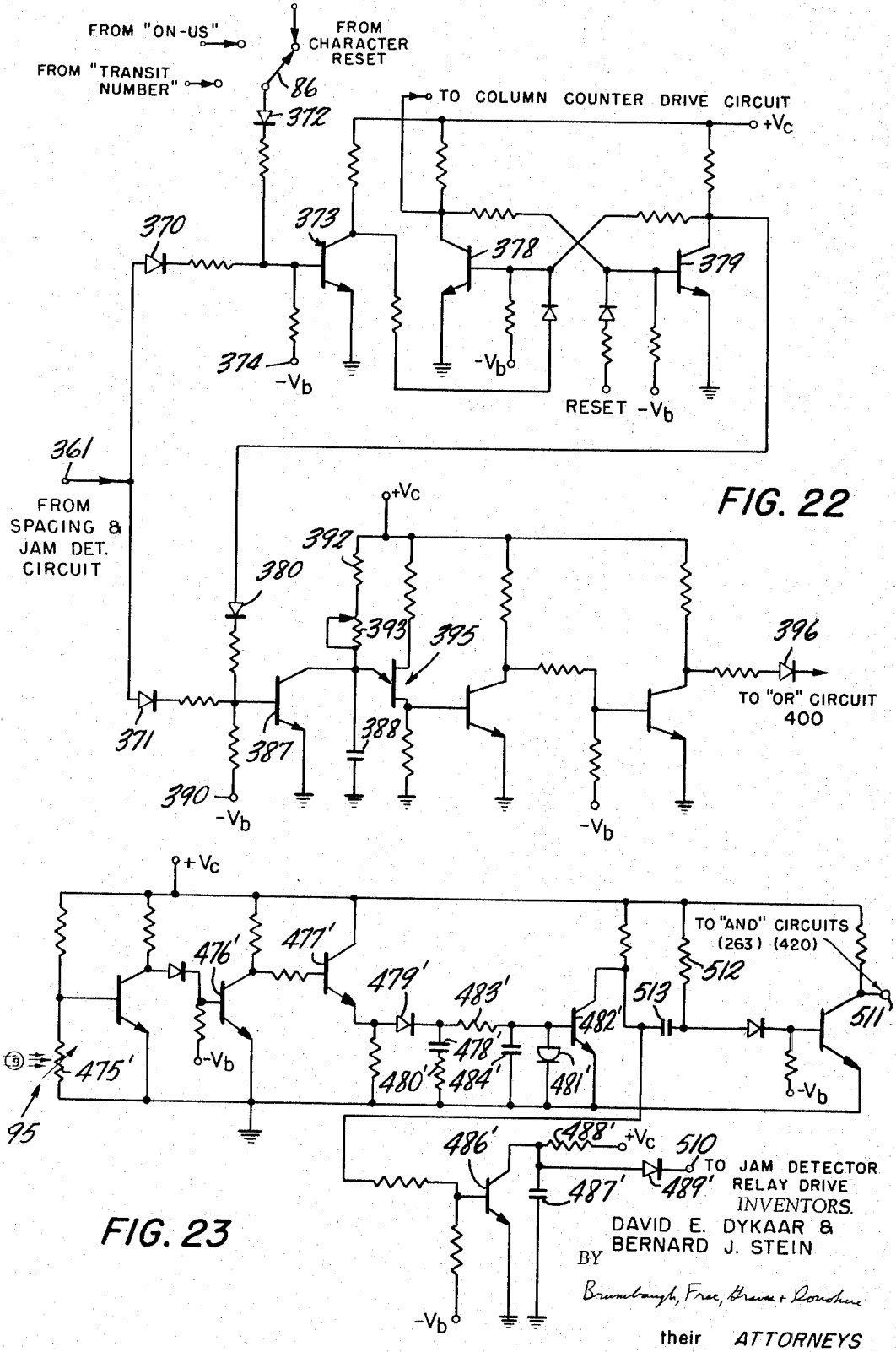

United States Patent Office 3,363,756
Patented Jan. 16, 1968

3,363,756
DOCUMENT HANDLING SYSTEM
David E. Dykaar, Bayside, and Bernard J. Stein, Jamaica Estates, N.Y., assignors to Lundy Electronics & Systems, Inc., Glen Head, N.Y., a corporation of New York
Filed June 1, 1965, Ser. No. 460,136
53 Claims. (Cl. 209—73)

ABSTRACT OF THE DISCLOSURE

A document sorting system which sorts documents into one of a plurality of pockets by reading at least one detectable character on each document fed thereto, generating a pocket selection signal representative to the detectable character, conveying the document past the entrance of the pockets, and energizing the pocket gate of the pocket into which the document is to be sorted so as to guide the document into that pocket.

---

This invention relates to a document handling system and, more particularly, to a method and apparatus for sorting documents in accordance with detectable characters thereon.

Such sorting apparatus has wide application, for example, in the banking industry for checks and deposit tickets, and in commerce for billing slips and the like. Sorting equipment may also be used to advantage for handling documents relating to a wide variety of business information by large corporations as well as by Government organizations such as the Civil Service Commission, Internal Revenue Service, Social Security Administration and the Armed Forces. The sorting apparatus is of maximum utility if it is susceptible of use both "on-line" with a computer or the like which processes the data on the documents while they are being sorted, as well as "off-line" wherein it is used by itself to sort the documents.

Conventional sorting apparatus requires complex mechanical equipment and electronic circuitry which makes the cost of such equipment prohibitive to all but the larger institutions, inasmuch as the expense of the down-time of such complex equipment is a significant factor to be considered. Such conventional equipment often cannot be operated from 110 volt single-phase lines and usually requires special air conditioning or other ventilating equipment.

Especially complex and critical circuitry has been used for reading the characters on the documents. For example, in some systems, it has been necessary to compare the electrical waveforms generated in response to each character with numerous characteristics stored in a memory unit or by correlation with a set of simulated waveshapes accomplished with resistor matrices which are properly weighted for each character. Prior art character readers often require tapped delay lines for translating the infomation which is produced serially as each character is scanned into a parallel input signal which can be accepted by logic circuitry. Such tapped delay lines are never ideal, as inherent losses distort the waveshapes fed therethrough. Also, a delay line must be terminated in such a way as to prevent a reflected wave from distorting a waveshape representing a given character. In addition, such critical networks drift out of adjustment as the circuit values of the components change with time.

It is often necessary, in prior art systems, to generate clock or synchronizing pulses which must be locked into synchronism with the sorting control circuitry. After the character on which a document is to be sorted is read, some prior art sorters employ a rotating magnetizable drum or the like for delaying the pocket selection signal in accordance with the transit time of the document from the reader to the pocket into which the document is to be sorted, the drum being coupled to the drive which conveys the documents through the sorter.

Such a system for transferring a pocket selection signal to the corresponding pocket not only requires moving parts, but the pocket selection signal is transferred to the selected pocket without regard to the actual position and progress of the corresponding document. Any slippage between the document and the transport mechanism due to wear or improper adjustment, for example, will result in the document and the signal on the rotating drum being out of synchronism. Furthermore, prior art sorting equipment is generally designed around a single system of characters and cannot be readily adapted to sort documents bearing characters of a plurality of different types.

These and other disadvantages of the prior art are obviated in the present invention by feeding the documents to a character reader, reading at least one detectable character on each document, generating a pocket selection signal representative of a selected character on each document, delaying the pocket selection signal in accordance with the transit time of a document between the character reader and a selected one of a plurality of pockets into which that document is to be sorted, conveying the document from the character reader to the selected pocket, detecting the presence of the document at one or more predetermined positions between the character reader and the selected pocket, and energizing the selected pocket gate in response to the delayed pocket selection signal and to the presence of the document at one of the predetermined positions so as to guide the document into the selected pocket.

For a more complete understanding of the invention reference may be had to the following detailed description of exemplary embodiments taken in conjunction with the accompanying figures of the drawings, in which:

FIGS. 2A and 2B are enlarged plan views of the apparatus of FIG. 1, including a block diagram of some of the electrical circuitry for transferring the pocket selection signals to the pockets;

FIGS. 3A and 3B are partial, enlarged views in front elevation of the apparatus of FIG. 1, portions being removed;

FIGS. 4A and 4B are partial, enlarged views in rear elevation of the drive mechanisms of the apparatus of FIG. 1;

FIG. 5 is an enlarged end elevational view of the apparatus of FIG. 3A, portions being removed;

FIG. 6 is a view taken along the line 6—6 of FIG. 5 and looking in the direction of the arrows;

FIG. 7 is an enlarged elevational view, partly in section, of the reading section of the apparatus of FIG. 3A;

FIG. 8 is a view taken along the line 8—8 of FIG. 3B and looking in the direction of the arrows;

FIG. 9 is an enlarged elevational view, partly broken away and in section, of a portion of the apparatus of FIG. 3B including a leaf spring pocket gate;

FIG. 10 is an enlarged perspective view of the leaf spring pocket gate of FIG. 9;

FIG. 11 is a partial, enlarged elevational view of the lower portion of a pocket shown in FIG. 3B;

FIG. 12 is a view taken along the line 12—12 of FIG. 3B and looking in the direction of the arrows;

FIG. 13 is a view taken along the line 13—13 of FIG. 3B and looking in the direction of the arrows, showing a photoelectric cell and the source of light associated therewith;

FIG. 14 is a view taken along the line 14—14 of FIG. 3B and looking in the direction of the arrows;

Figure 17D:
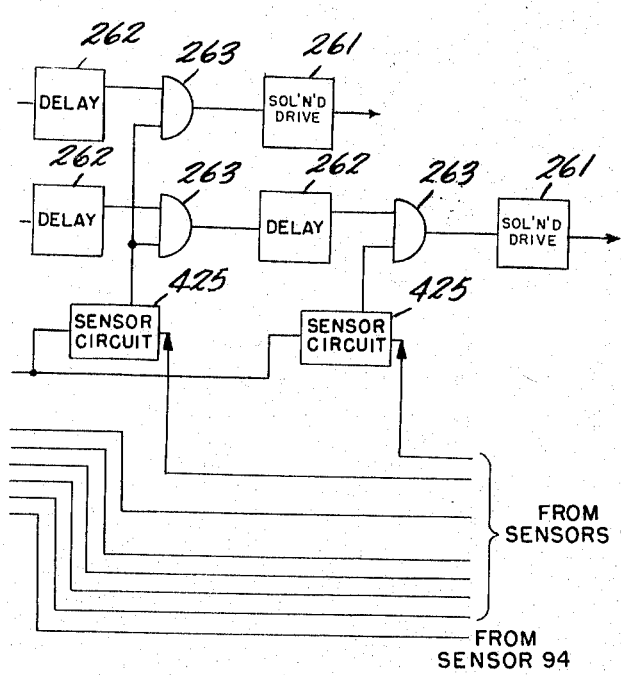
Figure 17A:
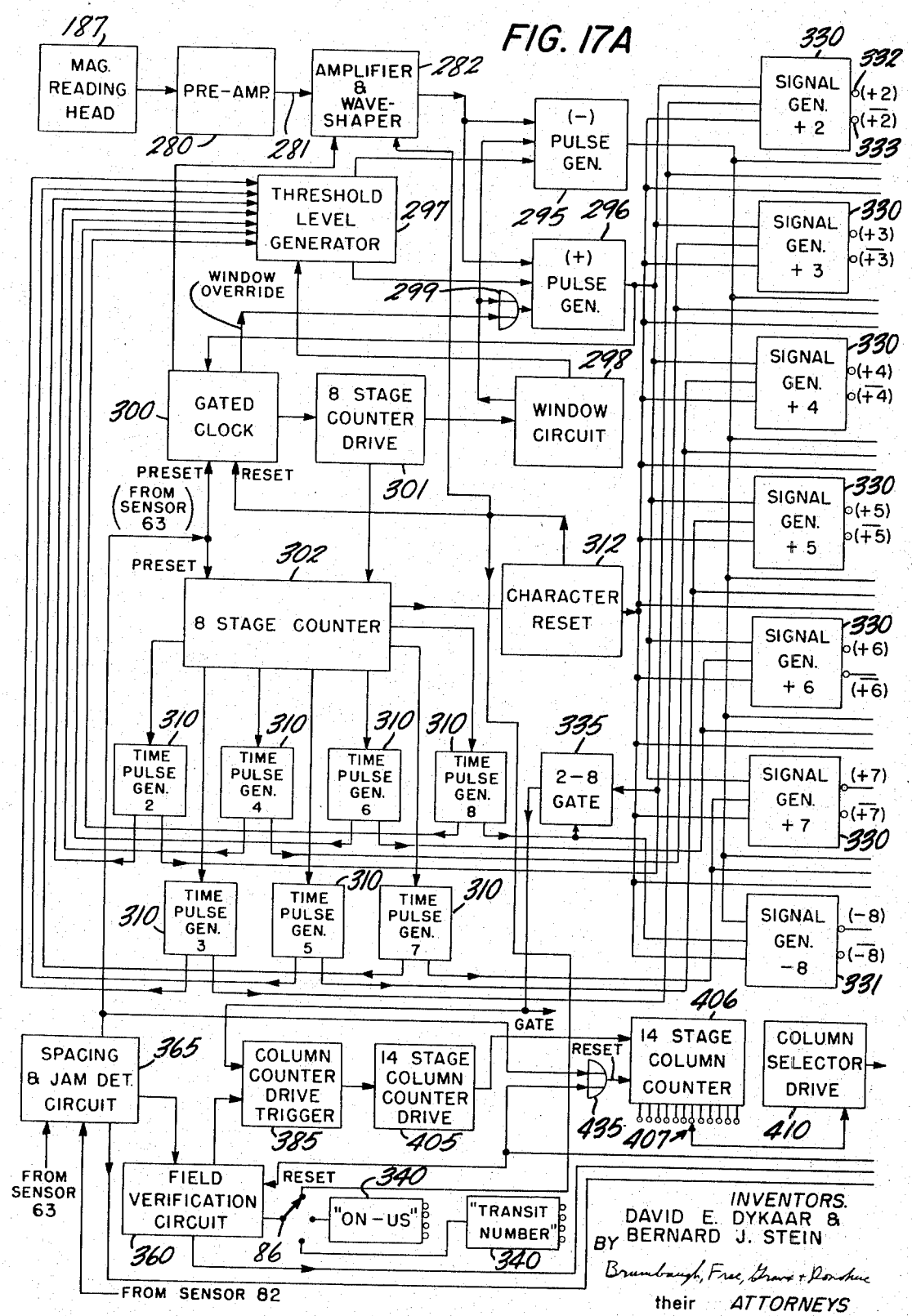
Figure 19A:
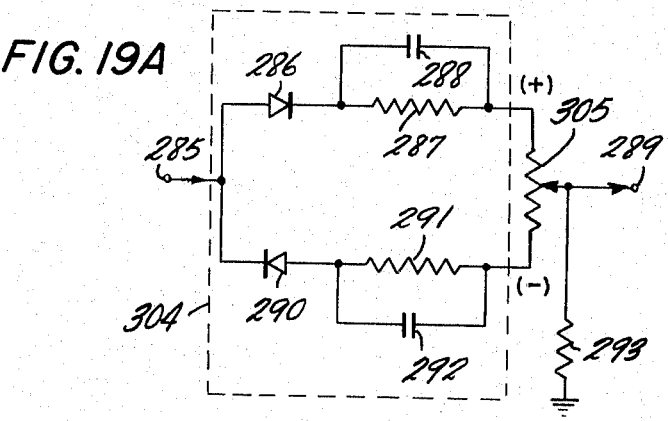
Figure 17C:
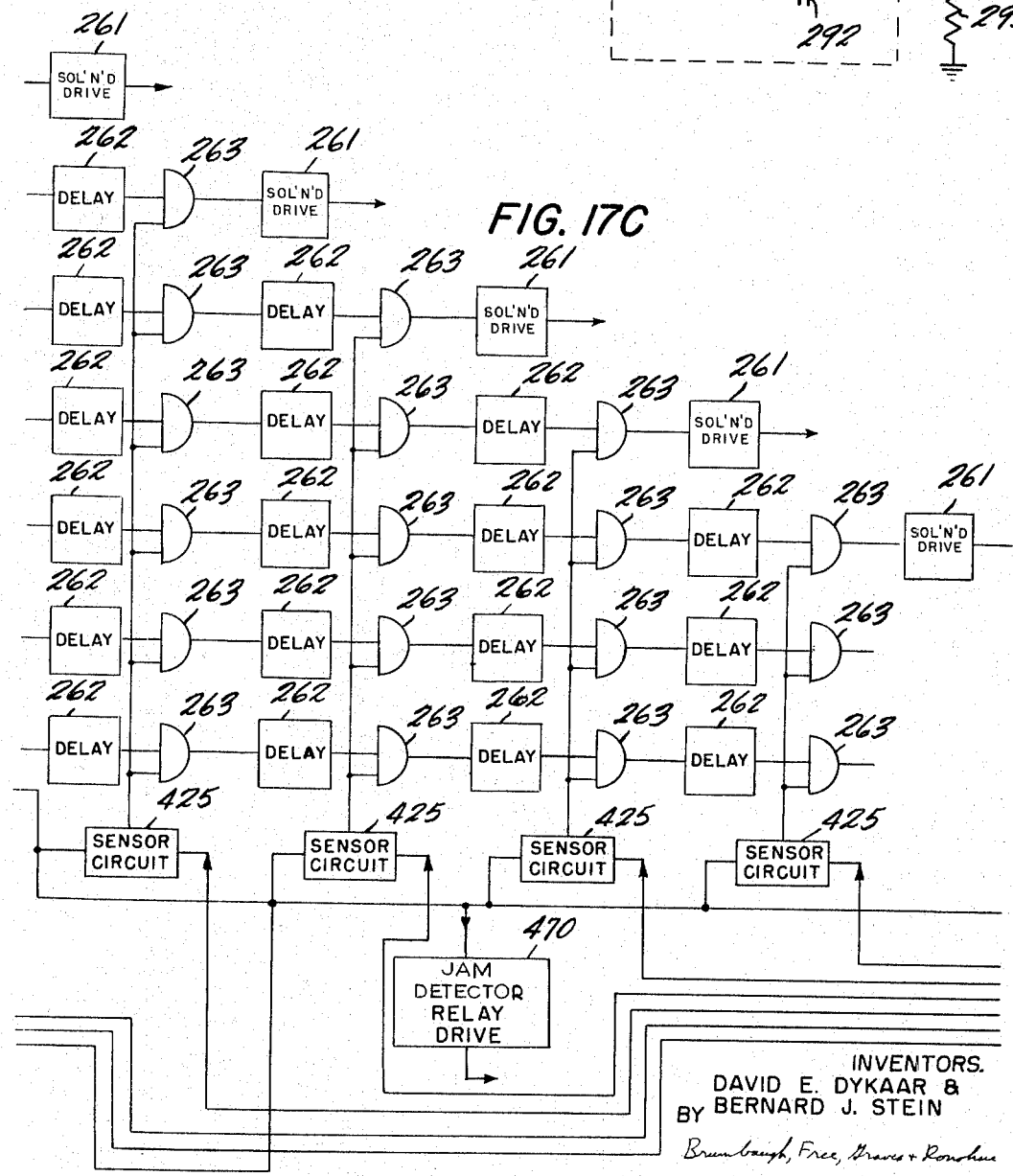
Figure 18:
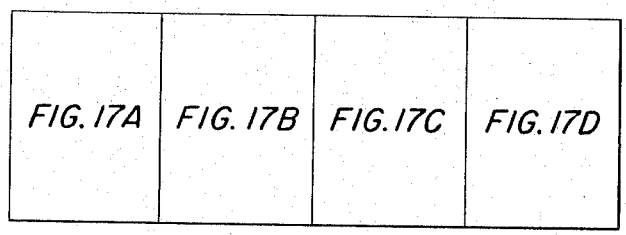
Figure 20:
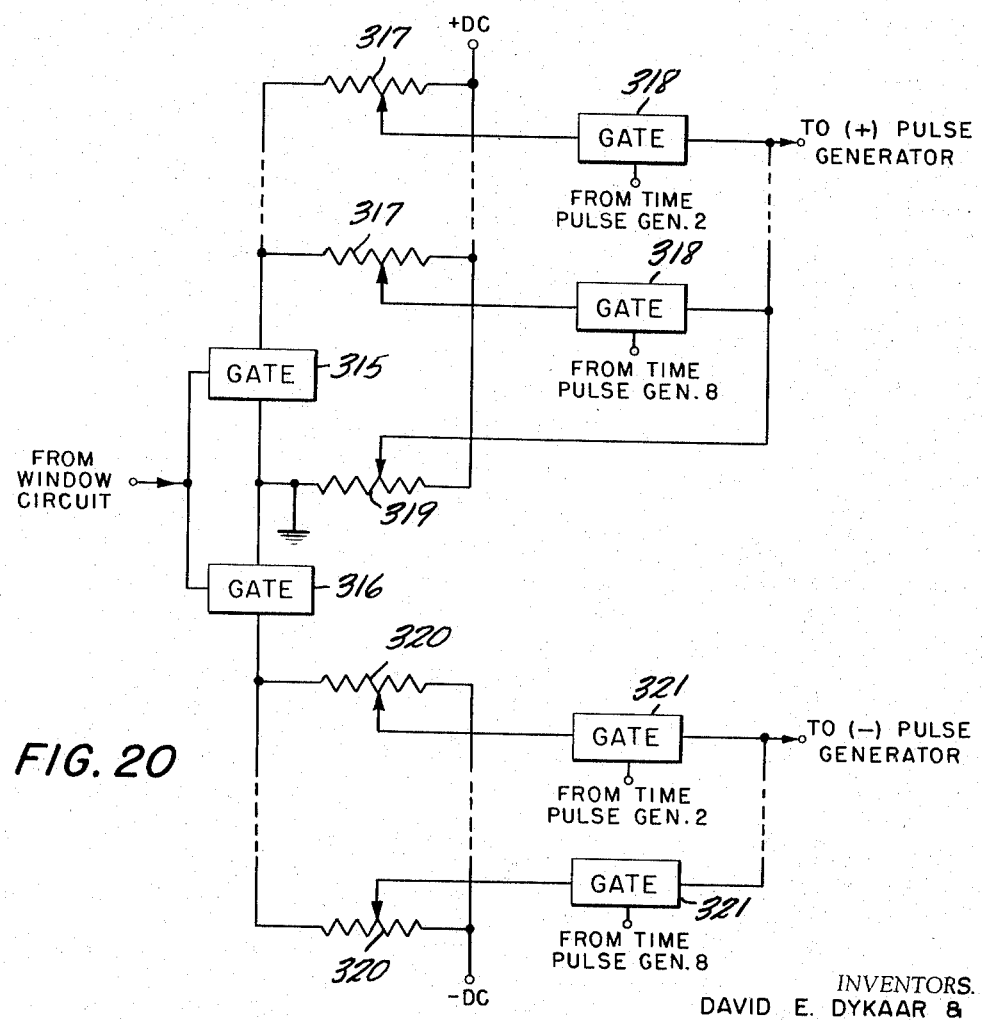
Figure 21:
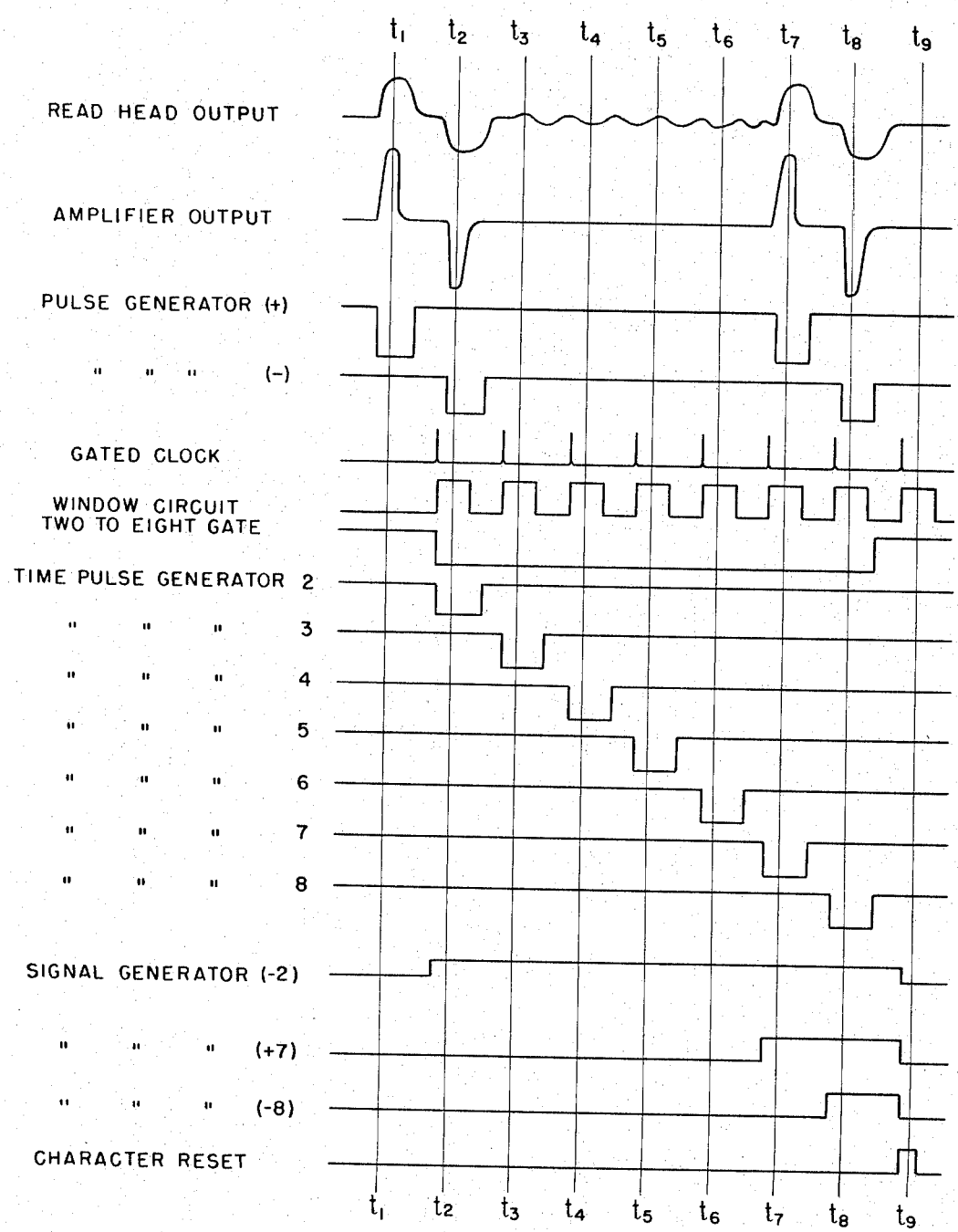
Figure 24:
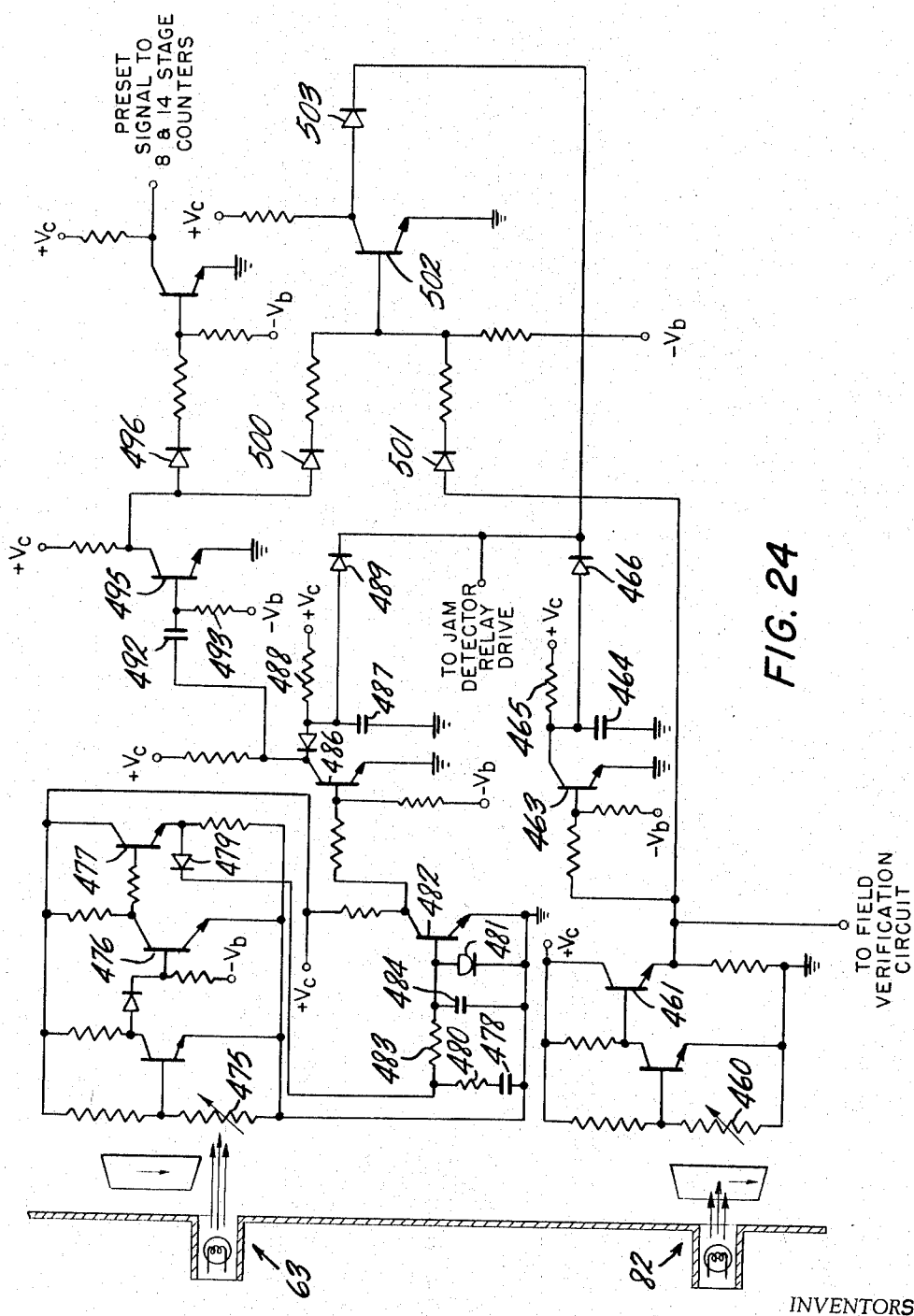

FIGS. 17A-D are interconnected block diagrams of electrical circuitry used in the sorting apparatus in accordance with an exemplary embodiment of the invention;

FIG. 18 shows the inter-relation of FIGS. 17A-D;

FIG. 19 is a block diagram of amplifying and wave-shaping circuitry in the block diagram of FIG. 17A;

FIG. 19A is a schematic diagram of wave-shaping and noise-suppressing circuitry in the block diagram of FIG. 19;

FIG. 20 is a schematic diagram of an electrical circuit, partly in block form, of the threshold level generator of FIG. 17A;

FIG. 21 is a diagram of waveforms at selected points in the block diagrams of FIGS. 17A and B;

FIG. 22 is a schematic diagram of the electrical circuit of the field verification circuit of FIG. 17A;

FIG. 23 is a schematic illustration of an exemplary photoelectric sensor circuit of FIGS. 17B-D; and FIG. 24 is a schematic diagram of the spacing and jam detector circuit of FIG. 17A.

Figure 1:
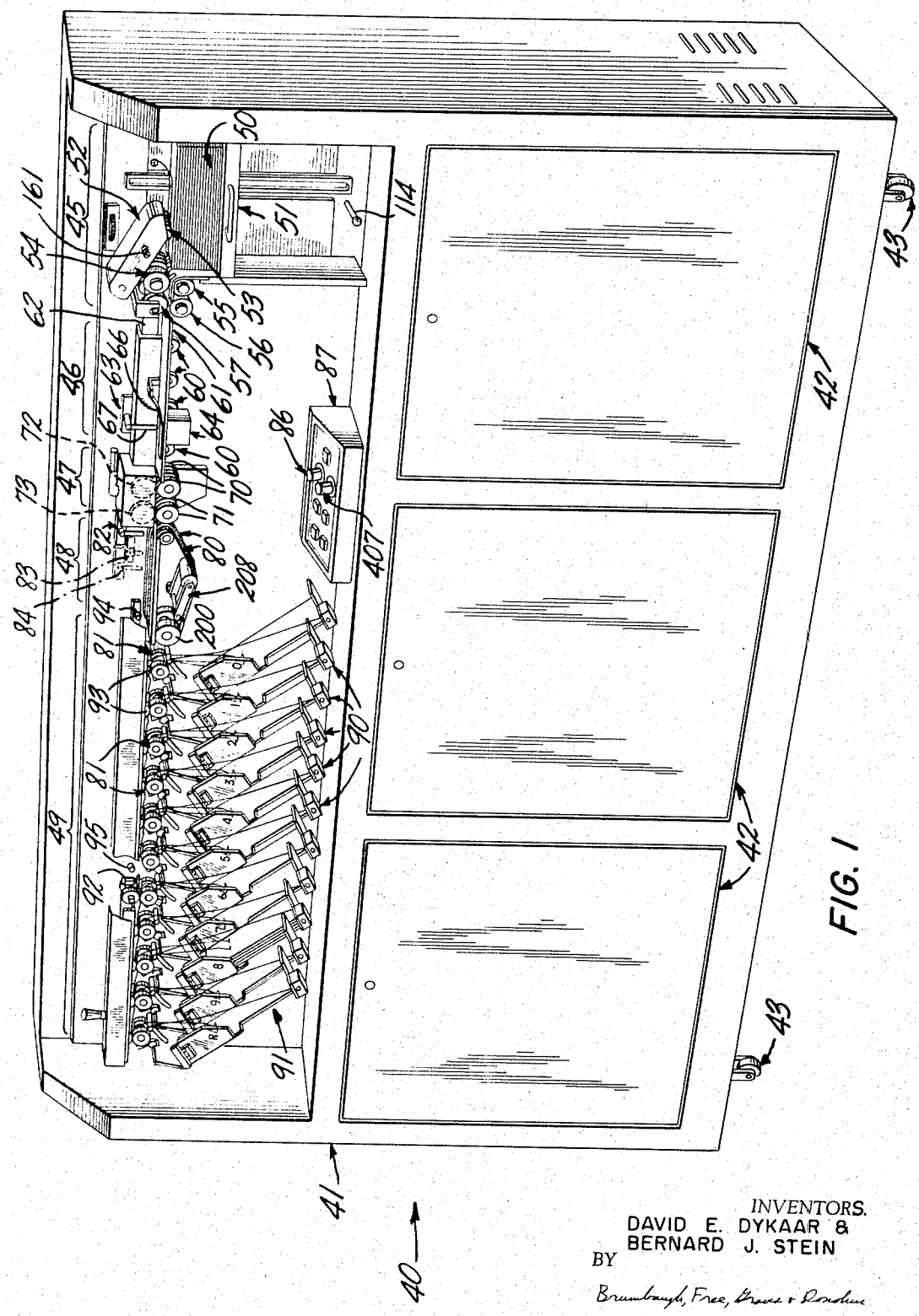
FIGURE 1 is a perspective view, portions being removed, of an exemplary embodiment of sorting apparatus according to the present invention.

A brief description of the invention and its method of operation may be had in conjunction with FIG. 1. The sorting apparatus 40 is mounted in an enclosure 41 which conceals much of the electrical and mechanical drive components behind a plurality of removable panels 42. The enclosure 41 is supported by a plurality of casters 43 so that the sorting apparatus may be readily moved to any desired location.

The document handling portion of the apparatus may be conveniently divided into a feeder section 45, a registration section 46, a reading section 47, a tape transport section 48, and a pocket section 49. A stack of documents 50 to be sorted is placed upon an elevating table 51 which is driven by a motor (e.g. FIG. 5) into engagement with an extractor 52. The extractor includes a plurality of rollers 53, the document engaging surfaces of which may be driven at a speed of about 60 inches per second, for example, so as to feed at least one document from the stack 50 to a bite formed between the document engaging surfaces of a plurality of separator rollers 54 which cooperate with a plurality of retard rollers 55 to pass single documents consecutively therebetween, the rollers 54 and 55 being driven clockwise as viewed in FIG. 1 so that the separator rollers 54 drive a document therebetween while the retard rollers 55 tend to prevent the passage of a document. According to one embodiment of the invention, the document engaging surfaces of the separator rollers 54 are driven at about 60 inches per second while those of the retard rollers 55 are driven at about 30 inches per second.

Disposed downstream of the retard rollers 55 are a plurality of pullout rollers 56, the document engaging surfaces of which are driven about 60 inches per second in a direction to convey the document to the registration section 46. A plurality of idler rollers 57 is spring mounted against the pullout rollers 56 to ensure that a document is firmly grasped, and the pullout rollers 56 are spaced from the extractor rollers 53 a distance less than the length of the shortest document to be sorted so that the pullout rollers 56 grip a given document before that document is released by the extractor rollers 53. This insures that each document is positively driven through the bite formed by the separator rollers 54 and the retard rollers 55, and it prevents a document from being turned or displaced laterally in the registration section 46 until the document has passed the pullout rollers 56, thereby preventing the trailing edge of each document from displacing any of the documents in the stack 50.

The registration section 46 includes four rollers 60 disposed below a platform 61 along which the documents move through the registration section, the platform being provided with apertures through which the rollers 60 extend so as to engage the documents. Disposed above each of the registration rollers 60 is an idler roller (FIG. 3A) which is spring-biased against its corresponding registration roller. A registration plate 62 is disposed perpendicular to the platform 61 and parallel to the direction of travel of the documents from the feeder section 45 to the reading section 47, and the registration rollers are mounted on shafts which are inclined at an angle of about 10°, for example, from a line perpendicular to the registration plate 62, so as to drive one edge of a document against the registration plate while the document is being conveyed to the reading section 47. In this way, each document is so aligned that the characters thereon, which are to be read, will pass in cooperative relation to a reading head (FIG. 3A) in the reading section 47.

A photoelectric sensor 63, which may, for example, include a photodiode or other suitable photoconductive device, the resistance of which is proportional to the light energy incident thereon, is disposed on one side of the platform 61 and cooperates with a suitable source of light in a housing 64 on the opposite side of the platform to detect the presence of a document therebetween. A slot 65 is provided in the platform 61 to permit the transmission of light therethrough (see FIG. 2A). A deflector spring 66 prevents the leading edge of each document from accidentally striking the light sensor housing 67.

The documents are conveyed through the registration section 46 at a speed of approximately 150 inches per second, thereby causing a gap between successive documents which is a function of the document length, inasmuch as the documents are fed through the feeder section 45 at about 60 inches per second. For example, the gap between 6 inch documents would be about 9 inches.

The documents are then conveyed through the reading section 47 by pairs of rollers 70 and 71, which are driven by a synchronous motor and against which pairs of idler rollers 72 and 73 are respectively spring-biased (shown in phantom in FIG. 1). The synchronous drive insures that each document is conveyed past the reading head at exactly 150 inches per second, inasmuch as the waveform generated by the reading head is dependent upon the speed of the document passing thereby. The rollers 70, 71 and 72, 73 firmly grip the documents in order to prevent them from being twisted due to the drag caused by the reading head, for example. If the documents bear magnetic ink characters, there is a charging head for magnetizing each character, downstream of which is located an electromagnetic transducer for generating a signal in response to and representative of each character passing in flux linking relation therewith. A pocket selection signal representative of a particular character on each document is generated and stored by electrical circuitry to be discussed hereinafter.

The documents are conveyed through the tape transport section 48 by a pair of tapes 80 against which are spring-biased a plurality of idler rollers. The tape transport section 48 serves as a speed transition means between the reading section 47, where the documents are conveyed at a speed of 150 inches per second, and the pocket section 49, where the documents are conveyed at a speed of 100 inches per second. When the lead edge of document is gripped by the first pair of drive rollers 81 in the pocket section 49, the tapes 80 slip or slide along the document and mutilation is prevented.

A photoelectric sensor 82 is disposed in the tape transport section 48 at a predetermined distance from the reading head such that the leading edge of a document is directly beneath this sensor when a specific field or group of characters on the document is approaching the reading head. Similarly, photoelectric sensors 83 and 84 (shown in phantom in FIG. 3A) may be employed to locate other fields on each document. A deflector spring 85 (FIGS. 2A and 3A) insures that the leading edge of a document will not accidently strike one of the shrouds extending from the sensors 82, 83 and 84. A switch 86 on a control panel 87 may be used to select the desired field from which one of the characters is to be read. The photoelectric sensor 82 also cooperates with the sensor 63 to determine whether the spacing between successive documents is less than a predetermined minimum value, as will be explained hereinafter. Furthermore, all of the photoelectric sensors in the sorting apparatus are employed to determine whether each document exceeds a minimum predetermined speed.

The pocket section 49 includes ten significant character pockets 90, designated "0," "1," "2," . . . "9" as well as a reject pocket 91, designated "R" and adapted to receive documents not guided into any of the significant character pockets 90. It is apparent that different numbers of significant character pockets may be used if documents are to be sorted in accordance with alphabetic or alpha-numeric characters, for example. Associated with each of the pockets 90 is a pocket gate 92 adapted to be energized in response to a corresponding pocket selection signal. The documents are conveyed from the tape transport section 48 along a path passing the entrances of the respective significant character pockets 90 and to the entrance of the reject pocket 91 by the rollers 81, against each of which an idler roller 93 is spring-biased. As each document leaves the tape transport section 48, it passes in cooperative relation with a photoelectric sensor 94 which operates in conjunction with electrical circuitry to be explained below to generate a signal which transfers the pocket selection signal from the aforementioned electrical storage circuitry.

If a document is to be sorted into the "0" pocket, of the significant character pockets 90 (the closest pocket to the tape transport section 48 in the embodiment illustrated), the corresponding pocket gate 92 is energized directly in response to the pocket selection signal. If a document is to be sorted into the "1" or "2" pocket of the significant character pockets 90, the pocket selection signal is first delayed in accordance with the transit time of the document to the corresponding pocket. If a document is to be sorted into any of the other significant character pockets 90, the circuit which energizes the corresponding pocket gate 92 requires coincidence of both the delayed pocket selection signal and a signal generated from circuitry including a photoelectric sensor 95 disposed upstream of that pocket gate. The delayed pocket selection signal passes through one or more delay stages under the control of the actual forward movement of the document through the pocket section 49. Thus the rollers 81 need not be driven by a synchronous motor, and any variation of speed of a document through the pocket section 49 due to slippage between the document and the drive mechanism, for example, will not result in the corresponding pocket gate being energized prematurely, inasmuch as that pocket gate cannot be energized until the leading edge of the document passes the corresponding photoelectric sensor 95.

*Feeder section*

Referring now to FIGS. 2A, 3A, 4B, 5 and 6, the feeder section 45 includes a document-receiving enclosure 100 formed by a side wall 101, two rear walls 102 and 103, and an internal lateral wall 104 of the main enclosure 41. A supporting frame 105 is provided with a pair of gibs 106 and 107 which guide a slide 108 on which the elevator table 51 is mounted, a portion of the slide extending through a vertical slot 109 in the main supporting frame 105. A drive cable 110 is mounted around an upper pulley 111 and a lower drum 112, the drum being driven through a conventional spring-mounted clutch 113 and a gear train 114' by a suitable drive motor 115. The drive cable 110 is secured to the slide 108 by a pin 116 and is maintained under tension by an extension spring 117. The clutch 113 may be disengaged by a clutch lever 114 through suitable means well known to the art, after which the elevating table 51 is disengaged from the drive motor 115 and may be easily moved to any desired position by means of a handle 118.

To load a stack of documents into the document-receiving enclosure 100, the clutch 113 is disengaged by means of the clutch lever 114, and the elevating table 51 is lowered a sufficient extent so that the stack may be easily loaded thereon. The elevating table 51 is raised until the uppermost document is just beneath the extractor rollers 53, and then the clutch lever 114 is actuated to couple the elevating table 51 with the drive motor 115. If a power switch in the control panel 87 is turned on, the drive motor 115 will drive the elevating table 51 (and with it the stack 50) until a switch 120 in the energizing circuit for the drive motor 115 is opened by the uppermost document in the stack, the switch being actuated by a document engaging foot 121. A deflector spring 122 mounted on the rear wall 103 insures that the outermost document is guided beneath the foot 121 as it is removed from the stack by the extractor 52. As documents are withdrawn from the stack, the document engaging foot 121 moves downwardly to a predetermined point at which the switch 120 is closed completing the energizing circuit for the drive motor 115. The upper surface 123 of the elevating table 51 is sloped downwardly toward the side wall 101 so that the stack 50 rests thereagainst. The upper portion of the side wall 101 forms a metering plate 125 which prevents all but the uppermost documents in the stack from being extracted by the extractor 52. Thus the elevating table 51 is automatically driven in an intermittent fashion by means of the switch 120 to maintain a minimum number of documents above the metering plate 125.

The extractor rollers 53, which have document-engaging surfaces composed of a suitable rubber, for example, drive at least one document between the separator rollers 54 and the retard rollers 55 with the aid of a pair of guides 126 and 127. As shown in FIG. 5, each group of rollers 54 and 55 is mutually spaced apart and coaxial, and each individual roller 54 is aligned with a corresponding individual roller 55. The durometer of the rollers 55 preferably exceeds the durometer of the rollers 54 and the axes of rotation of these rollers are mutually spaced such a distance that the document engaging surfaces of the rollers 54 and 55 are so spatially related as to insure that a document fed therebetween is securely gripped thereby. The shaft 130 on which the retard rollers 55 are mounted may be adjusted in the vertical direction by an adjustment knob 131 (FIG. 4B) through any suitable drive mechanism 132 known to the art so that the spacing between the rollers 54 and 55 may be adjusted to accommodate documents of different thickness and to correct for wear of their document-engaging surfaces. As an alternative embodiment, the durometers of the rollers 54 and 55 are the same but the coefficient of friction of the rollers 54 exceeds that of the rollers 55. In accordance with still another embodiment of the invention, the rollers 55 may be axially displaced from and extend between the rollers 54.

Disposed between adjacent separator rollers 54 is a plurality of spring-biased fingers 135 which urge documents fed by the extractor 52 into contact with the rollers 54 along a line substantially parallel with a line in the zone of contact between the rollers 54 and 55 perpendicular to the line of travel of a document therebetween. The fingers 135 also retain the documents against the document-engaging surfaces of the rollers 54 until the documents reach the zone of contact. In this way the documents are prevented from first striking the retard rollers 55 and being driven back toward the stack 50.

The fingers 135 exert an upward pressure against a document, thus insuring a driving force on the document by the roller 54 which exceeds the retarding force by the roller 55. In addition, this upward force compresses the roller 54 allowing the easier passage of thick documents which may greatly exceed the gap between the rollers 54 and 55. For example, it has been noted in testing, that even when separation is accomplished between successive documents of only .002″ thickness, documents that are .015″ thick may pass through the rollers 54 and 55. This separation capability is extremely important in a document feeder, in order that two documents do not enter the machine one on top of the other and remain undetected in that condition, causing inconvenience in an operation where each document must be accounted for. Furthermore, this highly significant separation capability has even been demonstrated in separating documents which have been stuck together by folding over the common corners of two documents or when two documents have been glued together with a light adhesion cement over a small area.

Disposed downstream of the rollers 54 and 55 and on opposite sides of the path of travel 140 of a document from the feeder section 45 to the reading section 47 are the pullout rollers 56 and 57, the rollers 56 having a suitable document-engaging surface of rubber, for example, and the metal idler rollers 57 being spring-biased against the rollers 56.

The rollers 53, 54, 55 and 56 are all driven by a suitable drive motor 141 (FIG. 4B) which is energized through appropriate conventional circuitry (not shown) by a switch in the control panel 87. The drive motor 141 is coupled (FIG. 2A) through a belt 142, a pulley 143, a shaft 144, gears 145 and 146, a shaft 147, a pulley 148, a belt 149, a feed clutch means 149a, and gears 150 and 151 to a gear 152. The clutch means 149a may be of any suitable conventional type which can be actuated by a feed control switch in the control panel 87 for selectively decoupling the gear train driven by the gear 150. The gear 152 drives the separator rollers 54 through a gear 153 and shaft 152, and the retard rollers 55 through the gears 155, 156, 157 and the shaft 130. The gear 156 also drives the pullout rollers 56 through the shaft 159. The extractor rollers 53 are driven through a belt 160 (FIGS. 5 and 6) mounted on the shaft 154 and another belt (not shown) within the housing of the extractor 52. The extractor 52 may be rotated by means of a handle 161 about a shaft 162 on which it is mounted to rest on a rubber post 163 to facilitate access to the document-receiving enclosure 100, if desired.

Registration section

The documents are driven through the registration section 46 (FIGS. 2A and 2B) between the guide 126 and the platform 61 by the registration rollers 60, the document-engaging surfaces of which are preferably composed of rubber, for example. A document is maintained in driving engagement with each roller 60 by a spring-mounted metal idler roller 170 (FIG. 4B). The rollers 60 are driven from the drive motor 141 (FIG. 4B) through a main drive belt 171 and registration drive belts 172, 173, 174 and 175. In order to convey a document to the registration section at a speed of 150 inches per second, the document-engaging surfaces of rollers 60 must be driven at a slightly greater speed, the ratio of the roller surface speed to 150 inches per second being equal to the secant of the acute angle (about 10° in the preferred embodiment) so that the shafts carrying the rollers 60 are disposed from a line perpendicular to the registration plate 62.

Reading section

The drive rollers 70 and 71 (FIGS. 3A and 7) which are of a non-magnetizable material such as aluminum and are formed with knurled document-engaging surfaces, are driven by a conventional synchronous motor 180 (FIG. 4B) through a drive belt 181, a spring-mounted idler 182 maintaining the desired tension in the drive belt 181. The pairs of idler rollers 72 and 73 have resilient document-engaging surfaces composed of rubber, for example, and are spring-biased against the corresponding pairs of knurled rollers 70 and 71 in order to insure that documents fed thereto are securely grasped and moved positively through the reading section 47. The idler rollers 72 and 73 may be lifted from engagement with the drive rollers 70 and 71 by means of an arm 184, which is coupled to the idler rollers 72 and 73 through a suitable mechanical linkage (not shown) known to the art. Disposed between the idler rollers 72 is an electromagnetic charging head 185 for magnetizing each magnetizable character which passes in flux-linking relation therewith. The electromagnet 185 preferably has pole pieces so formed as to produce flux lines aligned with the direction of travel of the documents through the reading section 47, and the magnetizing current for the electromagnet 185 is adjusted by suitable electrical circuitry (not shown) well known to the art to limit the flux lines produced below the electromagnet 185 to a space within a distance equal to the average thickness of the documents being sorted. In this way, when a correction label (bearing magnetizable characters) is pasted over incorrect magnetizable characters on a document, only the characters on the correction label will be magnetized by the electromagnet 185 as long as the thickness of the correction label is substantially equal to that of the average document. When the correction label passes beneath the reading head 187, only the proper signal will be induced inasmuch as there is negligible flux from the incorrect characters.

In order to insure that all characters are equally magnetized, a roller 186 (FIG. 3A) having a resilient document-engaging surface composed of rubber, for example, is mounted on the shaft carrying the drive rollers 70 directly beneath the electromagnet 185, the roller 186 being slightly compressed by a document passing thereby, thus insuring that each document slides along the electromagnet 185. Downstream of the charging head 185 and disposed between the idler rollers 73 is an electromagnetic reading head 187 which generates a signal in response to each magnetized character passing in flux-linking relation therewith, a resilient roller 188 causing a sliding engagement between each document and the reading head 187.

In the embodiment of the reading section 47, shown in FIG. 7, a spring-biased platen 190 urges a pair of guide strips 191 and 192, composed of suitable plastic material such as Mylar, against the charge head 185 and reading head 187, respectively, a pair of felt strips 193 being disposed between the strips 191 and 192 and the platen 190. The upstream edges of the strips 191 and 192 are ramped to insure the smooth passage of the documents through the reading section 47.

Tape transport section

The two tapes 80 (FIG. 1) are composed of a material suitable for facilitating sliding engagement with a document when the leading edge thereof is gripped by the first drive rollers 81 in the pocket section 49. The transport tapes 80 are driven by a pulley 200 which is coupled to the main drive belt 171 through a shaft 201 (FIG. 4A). Three pairs of metal idler rollers 202 (FIGS. 2A and 2B) are resiliently supported by a pair of leaf springs 203 and 204 which are mounted on a pair of posts 205 (FIGS. 3A and 3B), the tapes 80 being supported by a platform 206. A spring-biased idler 208 insures that the proper tension is maintained in the tapes 80.

Pocket section

Referring now to FIGS. 2B, 3B, 4A, 8, 9, and 10, the drive rollers 81, preferably having a document-engaging surface composed of rubber, are driven through a plurality of shafts 215 (FIG. 8) interconnected by a plurality of drive belts 216 (FIG. 4A) which in turn are coupled to the main drive belt 171 through a belt 217 and a pair of pulleys 218 and 219, the diameter of these latter pulleys being such that the document-engaging surfaces of the drive rollers 81 are driven at a speed of 100 inches per second.

Documents are driven along a path 225 (FIG. 9) through the pocket section 49 by the drive rollers 81, a document being maintained in driving engagement with each pair of drive rollers by a corresponding pair of idler rollers 93 (FIG. 3B) under the action of a spring 226. When a pocket gate 92 receives a pocket selection signal, a steel leaf spring 230 is lifted by an electromagnet solenoid coil 231 (FIGS. 9 and 10) into the document travel path 225 and intercepts the leading edge of the selected oncoming document and causes it to follow a path beneath the leaf spring 230 and around the periphery of the pair of drive rollers 81 to a point where it is grasped between the drive rollers 81 and a pair of metal idler rollers 232, which are biased against the drive rollers 81 by a spring 233 (FIGS. 9 and 12).

The solenoid coil 231 is preferably wound around a conventional U-shaped pole (not shown), and the leaf spring 230 completes the magnetic path and constitutes the armature of an electromagnet. The document is then driven into the corresponding pocket by the drive rollers 81 in conjunction with both pairs of idler rollers 93 and 232.

A wire 235 mounted on a post 236 is disposed (FIG. 9) between and in a different plane than a pair of spaced guide wires 237 in such a manner as to transversely flex a document entering any pocket 90 or 91 about an axis substantially parallel with the direction of travel of the document into the pocket, thereby increasing the stiffness of the document and directing it in a substantially straight-line path into the pocket above the stack of documents already therein. A wire 238 (FIGS. 9 and 14) mounted on the post 236 drives the trailing edge of the document downward or to the left as viewed in FIGS. 3B and 9 as soon as it is free of the wires 237, thereby insuring that the next document delivered to the same pocket will pass above or to the right of the first document. In this way, the documents received in any pocket are stacked in the order in which they are delivered to that pocket 90 or 91.

A wire 239 mounted on the post 236 retains the trailing edges of the documents stacked in any pocket 90 or 91 against the lower lateral wall 240 of the pocket. A wire 241 mounted on the post 236 retains the leading edges of the documents in a pocket 90 or 91 against the wall 240 and also actuates a conventional switch 242, such as a microswitch, after a predetermined number (or equivalent stack height) of documents have been received in the respective pockets, a button 243 or other means on the wire 241 driving the plunger of the switch 242 (FIG. 11). The housing 245 over the switch 242 and a lamp 244 is removed in FIG. 11 in order to show the details of this arrangement. When the switch 242 is actuated, the lamp 244 at the pocket is illuminated and the feed clutch means 149a is disabled by suitable circuitry (not shown) well known to the art, thus decoupling the rollers 53, 54, 55 and 56 from the drive motor 141 to stop the feed of documents from the stack 50 to the registration section 46. As soon as a filled pocket is emptied, feeding automatically resumes, unless a "stop feed" switch in the control panel 87 is actuated. For example, in FIG. 3B, pocket "8" is filled and its lamp 244 is illuminated.

FIG. 9 shows the leaf spring 230 in its quiescent or unoperated position. The spring 230 lies below the upper surface of a guide platform 250 in an aperture 251 formed therein so that documents pass freely on to the downstream pockets. The leaf spring 230 has a horizontal portion 255 (FIG. 10), which projects downstream along and in underlying relation to the document travel path 255 so as to feed each document above the upstream edge of the next guide platform 250. Each leaf spring 230 is mounted by a pair of screws 256 at the end remote from the portion which is driven by the solenoid 231. In the preferred embodiment, it requires less than eight milliseconds for the leaf spring 230 to be lifted into contact with the solenoid 231. This rapid reaction time by the leaf spring 230, which constitutes both the armature for the solenoid 231 as well as the gate for the corresponding pocket, permits the documents to be transported with relatively small spacing through the pocket section 49 at a relatively low speed (e.g., 100 inch per second) even though the pockets may be closely spaced, as is required in portable sorting apparatus of relatively small size. This slow speed enhances the document handling characteristics with respect to fragile documents, for example.

Once the leading edge of a document has passed beneath the upstream edge of a lifted leaf spring 230, the corresponding solenoid 231 may be de-energized to drop the leaf spring 230 on the document without damaging the document or disturbing its travel, due to the relatively low mass of the leaf spring 230.

When the leading edge of a document leaving the tape transport section 48 passes beneath the sensor 94, the pocket selection signal representative of the particular character read from that document is transferred from suitable storage circuitry 260 (FIG. 2B) along an electrical path to the corresponding one of the significant pockets 90. If a document is to be directed into the "0" pocket, the pocket selection signal is transferred directly to a suitable solenoid driver circuit 261, which delivers a pulse of sufficient magnitude and duration to the solenoid coil 231 so that the leaf spring 230 is lifted into the pocket transport path 225. A pocket selection signal for the "1" or "2" pocket is first delayed by a suitable delay circuit 262 for the length of time it takes the leading edge of a document to travel from the sensor 94 to a predetermined point approximately one and one-quarter inches, for example, before the upstream edge of the corresponding pocket leaf spring 230. For a document speed of 100 inches per second in the pocket section 49, 1¼ inches represents 12.5 milliseconds which is considerably more than the response time of the leaf spring 230.

Since the circuitry associated with the sensors 94 and 95 only responds to the lead edge of a document, as will be discussed hereinafter, it is possible to transport documents along the pocket section with a distance between successive documents of only 1¼ inches. In this case, the solenoid coil 231 will be energized with a document between the coil and the leaf spring 230. Because of the small force developed, the drag of the leaf spring 230 on the document will not retard its forward travel. As soon as the document trailing edge leaves the spring 230, the spring 230 will rise to deflect the next document which is destined for that pocket. Thus the relatively light force necessary to actuate the leaf spring 230 permits the spring 230 to rest on a document or come up under a document without disturbing its forward travel.

Each of the delay circuits 262 preferably comprises a "one-shot" or mono-stable multivibrator which is switched from a stable to an unstable state by an input pulse and generates an output signal delayed in time from the input signal by the amount that the circuit is in its unstable state, this time being determined by the values of the circuit components. A pocket selection signal for the "3" pocket is first delayed by its respective delay circuit 262, and the delayed pocket selection signal is then applied to one input of a conventional AND circuit 263, the other input of which is applied thereto as the leading edge of the document passes beneath the corresponding sensor 95 disposed upstream of the selected pocket gate at a predetermined position in the path 225.

FIG. 13 shows a typical one of the sensors 95, which is mounted on the main frame 105, illumination being provided by a lamp 265 disposed therebelow. The sensors 63 and 82 are similarly mounted, except that slots are provided in the main frame 105 (FIG. 3A), so that these sensors and their corresponding lamps (not shown) may be adjusted along the document transport path as desired. The delayed pocket selection signal is applied to the AND circuit 263 at a time when the leading edge of a document traveling at the nominal speed of 100 inches per second arrives at a point approximately 2 inches, for example, upstream of the corresponding sensor 95. Thus the delayed pocket selection signal "waits" at the AND circuit 263 until the leading edge of the document crosses the corresponding sensor 95, so that the pocket solenoid 231 is always energized when the leading edge of a document reaches a point at a predetermined distance from the corresponding pocket gate, regardless of any fluctuations in the speed of the document through the pocket section 49 due to any slippage between the document and the drive rollers 81 or within the pocket drive mechanism itself, for example.

Pocket selection signals for pockets "4" through "9" are released from the first AND circuit 263 when the leading edge of the corresponding document reaches the first sensor 95 and then is applied to a chain of successive delay circuits 262, the output of each delay circuit 262 being transferred by a respective AND circuit 263 to the following delay circuit 262 when the leading edge of the document reaches a corresponding sensor 95. Thus the pocket selection signal is transferred from each delay circuit 262 and its associated AND circuit 263, which acts as a temporary storage for the pocket selection signal, to the following delay circuit 262 in accordance with the progress of the document through the pocket section, until the pocket selection signal reaches the solenoid driver circuit 261 for the selected pocket into which the document is to be sorted. Therefore, a synchronous drive is not required for the pocket section 49 or any other section other than the reading section 47. Although the drive belts 142, 149, 160, 171, 172, 173, 174, 175, 216 and 217 may preferably be formed of reinforced rubber provided with internal cogs, generally known as "timing" belts, none of these belts serves a timing function.

If, for any reason, no pocket selection signal is transferred out of the storage circuitry 260 by a given document, none of the leaf springs 230 for the significant character pockets 90 will be actuated, and that document will be fed into the reject pocket 91. There is no leaf spring 230 or pocket solenoid 231 for the reject pocket 91, the "gate" for that pocket being fixedly disposed so as to guide any document engaged by the corresponding driver roller 81 into the reject pocket 91.

Inasmuch as the document-engaging surfaces of the rollers in the feeder section 45 are driven at a speed of about 60 inches per second, if the length of the shortest document to be sorted is 6 inches, the maximum feed rate of documents through the apparatus would be about 10 documents per second. Therefore, the minimum period of time in which successive pocket selection signals may be released from the storage circuitry 260 is 100 milliseconds. If documents having a minimum length of 6 inches are to be sorted, the delay provided by the delay circuit 262 into which the pocket selection signal is directly transferred from the storage circuitry 260 must be less than 100 milliseconds in order that two successive documents may be sorted into the same pocket.

*Magnetic ink characters*

The manner in which a pocket selection signal is generated from a particular detectable character passing beneath the reading head 187 will now be described for the case in which the characters are printed on a document with magnetic ink. In particular, the magnetic ink characters, sometimes called MICR (magnetic ink character recognition) characters, which have been adopted by the Bank Management Committee of the American Bankers Association will be considered with respect to this exemplary embodiment. These characters are shaped in a font designated as type E–13B, and the detailed specifications of the characters themselves and their location on a check may be found in Bank Management Publication 147 R2, published by the Bank Management Committee of the American Bankers Association, 90 Park Ave., New York, N.Y. Very briefly, these characters must be printed within a "clear band" extending 5/8 inch from the bottom of the check within 4 fields which are located in relation to the right edge of the check. The fields are located in the following order from the right reference edge: the "Amount" field, the "On-Us" field, the "Transit Number" field and the "Auxiliary On-Us" field (usually for check serial numbers), provided a given check has sufficient space to the left of the "Transit Number" field. The characters consist of the numerals "0" through "9," as well as four symbols: "On-Us," "Transit Number," "Dash" and "Amount." The amount data always consists of ten digits bracketed by two "Amount" symbols, and the "Transit Number" data always consists of two groups of four digits each, separated by a "Dash" symbol and bracketed by two "Transit Number" symbols. The Transit Number field is for the combined routing symbol—transit number of the drawee bank.

Considerable latitude is permitted each bank in the assignment of its account numbers and banking codes within the "On-Us" field, but an "On-Us" symbol must appear to the right of the account number, and an "On-Us" symbol may only be used in the "On-Us" and "Auxiliary On-Us" fields. There are no requirements regarding the number of spaces or the positions of characters within either the "On-Us" or "Auxiliary On-Us" fields.

*Analog-to-digital conversion*

Figure 15:
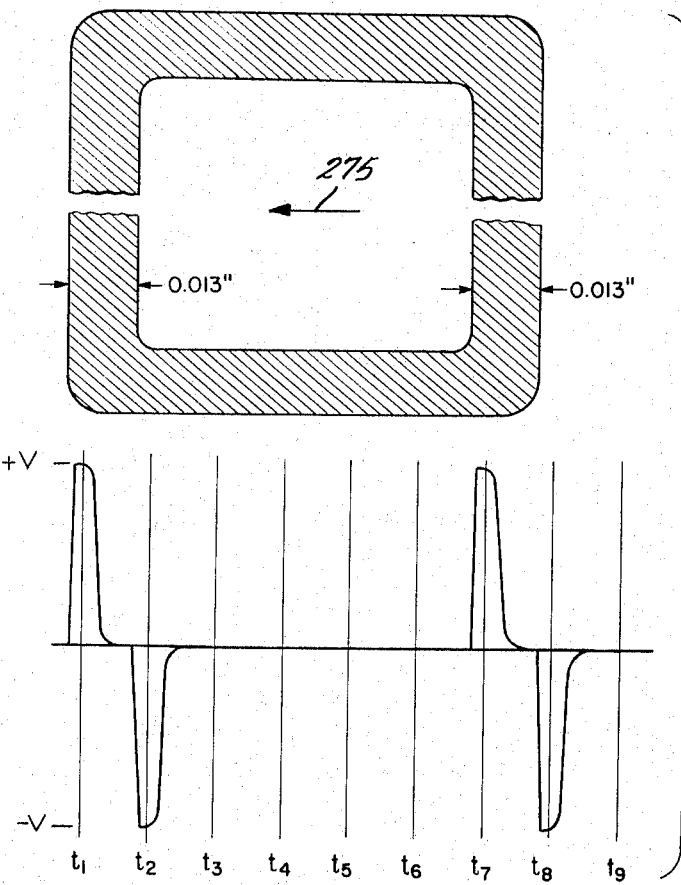
FIG. 15 depicts an exemplary form of detectable character "0" and a typical waveform of the signal generated by a magnetic reading head if the "0" is magnetized and is passed in flux linking relation to the reading head.

FIG. 15 depicts the character "0" and a typical waveform of the signal generated by the magnetic reading head 187, if the "0" is magnetized by the chargehead 185 and passed in flux linking relation to the reading head 187 in the direction shown by the arrow 275. It can be seen that all changes in shape of the character "0" occur in increments of 0.013 inch. This is true for all types of E–13B characters. The length of the active area of the reading head 187 in the direction transverse to the path of travel of checks thereby is such that the entire clear band (5/8 inch) is scanned in order that any MICR character therein will be read, while the width of the active area is small with respect to the increments in which all changes in character shape occur (0.013 inch).

Inasmuch as all changes in dimensions of the characters occur in increments of 0.013 inch and the characters are driven past the reading head 187 at exactly 150 in./sec. by the synchronous drive motor 180, it is apparent that either positive or negative pulses will occur in increments of 86.6 microseconds in the waveform generated by the reading head 187, depending upon whether the area of the character increases or decreases, respectively. Furthermore, the positive and negative pulses may only occur at 8 distinct times which may be designated $t_1$ through $t_8$ (FIG. 15), inasmuch as none of the MICR characters are wider than the numeral "0." At the time $t_9$, a reset pulse is generated to reset some of the electrical circuitry, as will be discussed more fully hereinafter.

The characters are identified by the apparatus according to the present invention by determining the polarity of the signals generated by the reading head 187 at the various times $t_1$ through $t_8$. For example, the numeral "0" may be identified by recognizing positive pulses at $t_1$ and $t_7$, negative pulses at $t_2$ and $t_8$, and the absence of pulses at the times $t_3$ through $t_6$. It may be noted that a positive pulse will always occur at $t_1$, when the leading edge of the magnetizing character passes the reading head 187, and the last pulse produced by any character is always negative, although the time of occurrence of this final negative pulse depends upon the width of the given character (some of the characters being narrower than the numeral "0"). As a practical matter, it is not necessary to have a signal or absence thereof at all 8 time-periods in order to identify one of only 14 possible E-13B characters, as will become apparent below.

Referring now to FIGS. 17A and B, the signal from the magnetic reading head 187 is first amplified by a conventional pre-amplifier 280 which is physically mounted very close to the reading head 187 so as to maximize the signal-to-noise ratio and is then fed through a low impedance line 281 to an amplifier and wave-shaping circuit 282, the output stage of the pre-amplifier 280 being an impedance matching network such as a conventional emitter-follower circuit, for example.

The amplifier and wave-shaping circuit 282 (FIG. 19) includes a pair of conventional amplifiers 283 and 284, and a wave-shaping and noise-suppressing circuit 304, which provides relatively narrow positive and negative output pulses to opposite ends of a potentiometer 305, the tap of which is connected to the input of the amplifier 284. A signal applied to the input terminal 285 of the circuit 304 (FIG. 19A), depending upon its polarity, may either pass through a signal path including a diode 286 of one polarity series-connected with the parallel combination of a resistor 287 and a capacitor 288 coupled to an output terminal 289 through the potentiometer 305, or through a signal path including a diode 290 of opposite polarity series-connected with the parallel combination of a resistor 291 and a capacitor 292 through the potentiometer 305 to the output terminal 289 which is also connected through a resistor 293 to a point at a reference potential such as ground. Positive pulses are transmitted through the amplifier 282 by way of the signal path including the diode 286, and the negative pulses are transmitted through the other signal path.

Referring to the output waveforms in FIG. 21, the leading edge of a positive pulse from the reading head 187 tor 288 and the resistor 287 are so chosen that the capacitor 288 and producing an output pulse at the terminal 289, the leading edge of which substantially coincides in time with the leading edge of the input pulse on the termnial 285. The input pulse from the reading head 187 is relatively broad, however, and the values of the capacitor 288 and the resistor 287 are so chosen that the capacitor 288 differentiates the waveform so that the duration of the output pulse is substantially less than that of the input pulse. Similarly, the action of the capacitor 292 and the resistor 291 substantially narrow a pulse delivered to the diode 290 without, however, delaying the leading edge thereof.

The circuit of FIG. 19A also acts as a noise suppression means in the following manner. Minor fluctuations in the level of the reading head output signal due to extraneous noise from poorly printed characters or magnetic waste particles in the document, for example, are biased out by a back bias voltage on the diodes 286 and 290 resulting from a change produced on the capacitors 288 and 292 by preceding signals of correct polarity and magnitude. The back-biased diodes 286 and 290, therefore, provide a threshold level which an input signal must exceed, so that noise fluctuations do not appear at the output terminal 289. When no input signal is present, the diodes act as clippers, providing their own bias from their inherent forward breakover point.

Figure 16:
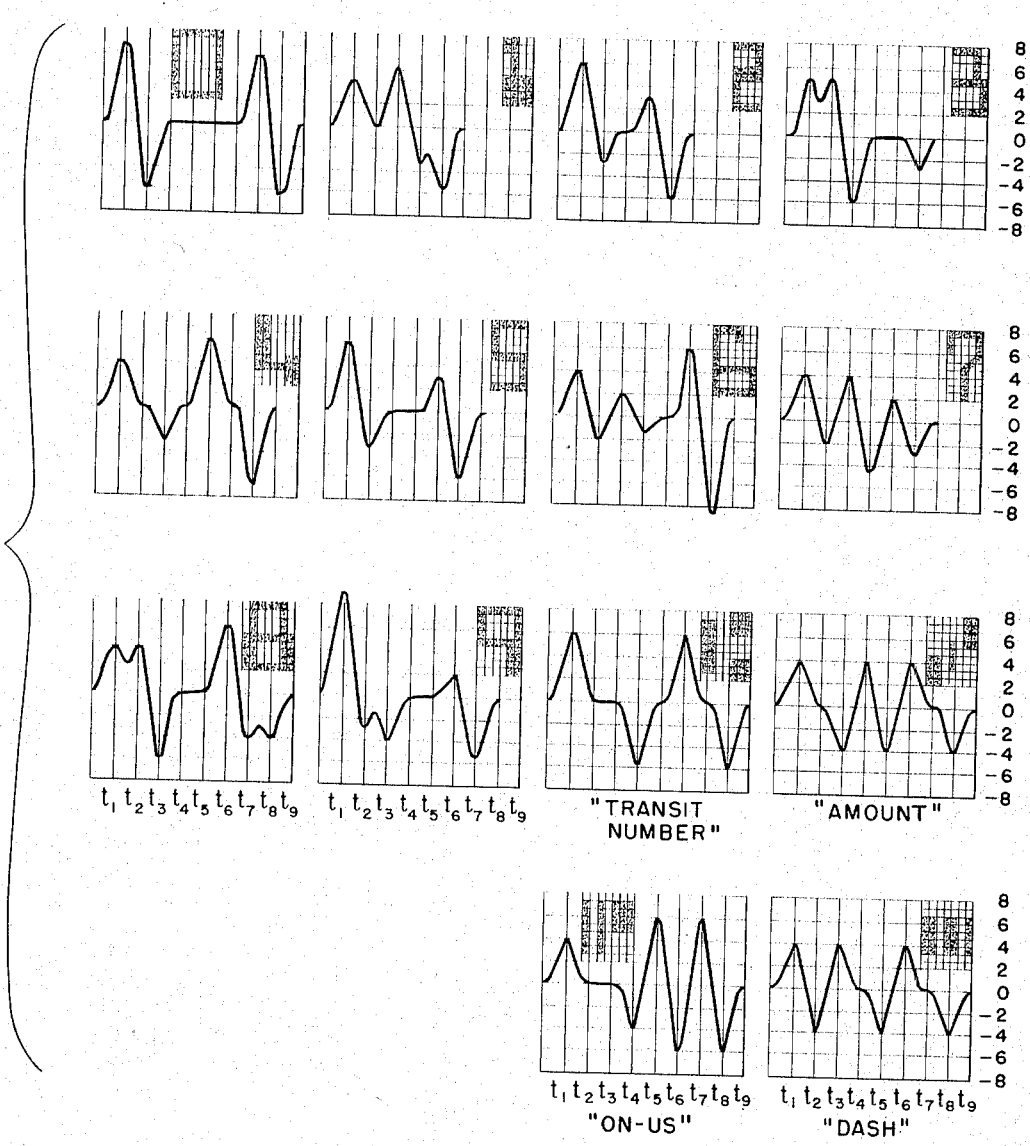
FIG. 16 depicts typical waveforms generated from the 14 magnetic ink characters shaped in the type E-13B font which have been adopted by the Bank Management Committee of the American Bankers Association.

The waveform of the amplifier output of FIG. 21 (for the numeral "0") shows that the pulses from the reading head output have been amplified and narrowed and that the noise has been rejected. This waveform may be compared to those illustrated in FIG. 16, which are typical waveforms from the E-13B characters without the benefit of the wave-shaping and noise-suppressing circuitry of FIG. 19A.

The output of the amplifier 283 is coupled through a conventional gate 306 to a conventional peak detector 307, the gate 306 being enabled by a gating pulse generator 308 which is triggered by a gated clock 300 (to be discussed hereinafter) in response to the positive pulse occurring at time $t_1$. Thus the peak amplitude of the first positive pulse generated from each character is detected and stored by the peak detector 307. In order to insure that the stored voltage level is not disturbed by the pulses occurring at the times $t_2$ through $t_8$, the values of the circuit components of the gating pulse generator 308, which may be a conventional "one-shot" multivibrator, are selected to provide a gating pulse of about 65 microseconds, for example.

The output of the peak detector 307 is fed through a conventional inhibit gate 306A to a suitable variable impedance 309, which is preferably the dynamic impedance from collector to emitter of a transistor, the output of the peak detector 307 being applied to the base thereof. The gate 306A is disabled by the gating pulse from the gating pulse generator 308, during the 65 microsecond time interval. The variable impedance 309 is an element of a voltage dividing network in the amplifier 283, so that the amplitude of the output of the amplifier 283 is adjusted in accordance with the magnitude of the first positive pulse generated from each character. As an alternative embodiment, the amplifier 283 may be a conventional variable gain amplifier, the gain controlling voltage being obtained from the peak detector 307 through a conventional inverter (which would replace the variable impedance 309), if required.

By so shaping the waveforms applied to the amplifier and wave-shaping circuit 282, the incidence of misreading or non-reading of characters is greatly reduced. For example, the numeral "9" (FIG. 16) has a relatively small positive pulse at time $t_6$ which is not one of the required inputs for the preferred logic for this numeral, as will be discussed hereinafter. Nevertheless, a noisy "9" might be read as a "6" were it not for the adjustment of the amplitude of the "9" waveform in response to the amplitude of the very high initial pulse thereof. In particular, the amplitude of the waveform at times $t_2$ through $t_8$ is reduced so that the potentially troublesome positive pulse at time $t_6$ is suppressed. Similarly, a strong noisy signal from other characters would be attenuated to avoid misreading or non-reading.

The automatic adjustment of the waveform amplitude in response to the amplitude of the initial positive pulse is of additional significance because each waveform is applied to a threshold amplifier in which the portions of the waveform at the times $t_2$ through $t_8$ must exceed predetermined different threshold levels before the waveform is "read," as will be discussed hereinafter. Thus the level of the waveform applied to the threshold amplifier must be within a particular range or the character will be misread or non-read. It is apparent that the amplifier 283 and the associated circuitry described above increase the signal-to-noise ratio of the signals applied thereto.

Additional waveshaping is accomplished by the potentiometer 305. The variable tap thereof is set so as to decrease the attenuation of the negative pulses with respect to the positive pulses. This insures that certain negative pulses will be detected despite the overall attenuation caused by the variable impedance 309 for certain characters. For example, it is desirable to suppress the positive pulse at time $t_6$ of the numeral "9," as mentioned above, but the negative pulse at time $t_7$ is a required logic input. Thus the adjustment of the tap of the potentiometer 305 prevents the overall attenuation of the waveform from suppressing the negative pulse at time $t_7$.

The polarity of the output signal from the amplifier and wave-shaper 282 is determined by a (—) pulse generator 295 and a (+) pulse generator 296. Both pulse generators 295 and 296 produce negative output pulses (FIG. 21), the polarity sign indicating the polarity of an input pulse which is required before they will generate an output pulse. The pulse generators include three sections: a pulse generating stage which may be a conventional "one-shot" or monostable multivibrator, for example, which is preceded by a conventional gate and a conventional threshold amplifier. The threshold levels of the threshold amplifiers of the pulse generators 295 and 296 are selectively and variably established by a threshold level generator 297 to be discussed presently.

The gating signal for the gates of the pulse generators 295 and 296 is provided by a window circuit 298. The window circuit 298 also provides a gating signal for the threshold level generator 297. Thus a pulse from the amplifier 282 will selectively trigger one of the pulse generators 295 and 296, provided that the input pulse thereto exceeds a threshold level established by the threshold level generator 297 and provided that the gate of that pulse generator is enabled by the window circuit 298. Inasmuch as every character generates a positive pulse at time $t_1$, the output of the (+) pulse generator 296 drives the gated clock circuit 300. The gated clock circuit 300 includes a "flip-flop" or bistable multivibrator which controls the operation of a conventional oscillator providing output pulses every 86.6 microseconds, i.e., the output pulses are successively spaced by the distance between successive times $t_1$ through $t_8$.

As illustrated in FIG. 21, the gated clock output pulses approximately coincide in time with the leading edge of the amplifier output pulses. The gated clock output pulses are preferably advanced in time by placing an initial charge on the capacitor of a conventional R–C relaxation circuit constituting the oscillator of the gated clock circuit 300. The gated clock drives an eight-stage counter drive 301, which is a conventional pulse generator suitable for driving the window circuit 298 and an eight-stage counter 302.

The window circuit 298 is a conventional mono-stable multivibrator which, in response to each clock pulse, provides an output pulse having a width of 57 microseconds, for example, which is a sufficient period of time to enable the pulse generators 295 and 296 so that they will be triggered by a pulse derived from any detectable character located within the tolerances established for the E–13B characters. The window pulses are located symmetrically in time about the times $t_1$ through $t_8$ at which a character pulse may occur, thereby preventing the pulse generators 295 and 296 from being triggered by extraneous noise pulses which may occur during times when there is no window pulse. During the time when no character is being scanned (and there are no clock or window pulses), the (—) pulse generator 295 is disabled. A window "override" voltage from the bistable multivibrator in the gated clock circuit 300 enables the (+) pulse generator 296 through a conventional "OR" circuit 299, so that the first positive pulse from the next character scanned will trigger the (+) pulse generator 296 and turn on the gated clock 300.

The eight-stage counter 302 may be of any conventional type known to the art, and provides time signals corresponding to the times $t_1$ through $t_8$ by means of selectively energized time pulse generators 310, which may be conventional "one-shot" multivibrators, for example. The eight-stage counter 302 also drives a character reset circuit 312 which resets the gated clock 300 by setting its bistable multivibrator in the state which disables its oscillator. As mentioned above the bistable multivibrator of the gated clock 300 also provides a "window override" voltage for the pulse generator 296, so that the above-described cycle may be initiated again when the next character is scanned. The character reset circuit 312 also discharges the peak detector 307 so that it may detect and store the peak amplitude of the first positive pulse generated from the next character.

A schematic diagram of the threshold level generator 297 is shown in FIG. 20. The window pulses from the window circuit 298 enable a pair of gates 315 and 316, during predetermined time periods in which a different predetermined positive threshold signal level is established for the pulse generator 296 for each of the times $t_2$ through $t_8$, the magnitude of the threshold level being established by respective potentiometers 317 which are coupled to the (+) pulse generator 296 through a respective gate 318 which is energized by the output pulse from the corresponding time pulse generator 310. A potentiometer 319 is adjusted to provide the requisite threshold level which the first positive pulse derived from each detectable character must exceed to trigger the pulse generator 296, this steady state threshold level being established at a value such that the leading edge of a character is readily recognized. Similarly, different negative threshold levels are selectively provided for the (—) pulse generator 295 for each time $t_2$ to $t_8$ by means of respective potentiometers 320 and gates 321. No steady state threshold levels are required for the (—) pulse generator 295, inasmuch as the pulse generator 295 is disabled by the absence of window pulses.

The determination of the polarity of the output signal from the amplifier 282 at the times $t_1$ to $t_8$ is made by the digital signal generators 330 and 331. Each of the signal generators 330 and 331 includes a conventional AND circuit, one input of which is connected to the output of the corresponding time pulse generator 310, the other input being connected to a respective one of the pulse generators 295 and 296 depending upon the polarity of the signal. Each signal generator AND circuit drives a conventional bistable multivibrator, the inverse outputs of which appear at a pair of terminals 332 and 333.

For the (+2) signal generator 330 to provide an output signal at the terminal 332, signifying that a particular character has a positive pulse at the time $t_2$, an input pulse is required from both the (+) pulse generator 296 and the time pulse from the "2" time pulse generator 310. If there is no positive pulse at the time $t_2$ generated by a particular character, the $(\overline{+2})$ terminal 333 always provides a "not" output signal.

Similarly, a signal on the terminal 332 of the (—2) signal generator 331 indicates that a negative pulse occurred at the time $t_2$, while a "not" signal on the terminal 333 thereof indicates the absence of a negative signal at time $t_2$. As mentioned above, there is always an initial positive signal, i.e., a "+1" signal, generated by each character and the final pulse is always negative. Therefore, "—1" and "+8" signals can never be generated. Therefore no signal generators 330 and 331 are provided for "+1," "—1," or "+8" signals.

A final signal used in the logic matrix to be next discussed is the "gate" signal generated by a "2–8" gate circuit 335, which includes a conventional bistable multivibrator set by the output of the "2" time pulse generator 310 and reset by a conventional "one-shot" multivibrator driven by the output of the "8" pulse generator 310, so that the output signal of the "2–8" gate 335 begins at time $t_2$ and ends at a time between $t_8$ and $t_9$. By the time $t_8$, all of the appropriate character digital signals are selectively generated by the signal generators 330 and 331 for each detectable character passing in flux-linking relation to the reading head 187, and all of the bistable multivibrators in the signal generators 330 and 331 are reset by the character reset 312 at the time $t_9$. The digital signals appearing at the respective terminals 332 and 333 are read at a time between $t_8$ and $t_9$ in response to the "gate" signal appearing at the output means designated "GATE" (FIG. 17A) from the "2–8" gate 335 by the logic matrix.

Logic

As discussed above, a character is read by determining the polarity of the waveform derived therefrom at the predetermined times $t_2$ to $t_8$. The characteristics of the waveforms of the E–13B characters shown in FIG. 16 reveal that any particular character may be distinguished from the rest by determining whether positive, negative or zero voltages exist at the times $t_2$ to $t_8$. Thus when certain combinations of output signals from the signal generators 330 and 331 are present, a particular character is recognized. Selective combinations of outputs from the signal generators 330 and 331 are connected by means of a logic matrix to characteristic AND circuits 340 (FIGS. 17A and 17B) for the numerals "0" to "9" and for the symbols "On-Us" and "Transit Number."

If all possible inputs to the AND circuits 340 were utilized to identify a character there would be a very high probability of correctly sorting the character-bearing document into the desired significant character pocket 90, but there would also be a very high non-read or reject rate. On the other hand, if a minimum number of digital signals representative of the logic for the detectable characters were used to identify a character, there would be a relatively low reject rate, but a very high misread rate. A preferred logic for the digital signals required to identify the E-13B characters, in accordance with the present invention, appears in the following table:

TABLE I

| Character | Logic |
|---|---|
| ON—US | $(+5) \cdot (-6) \cdot (-8) \cdot [\overline{(+6)} \cdot \overline{(-3)}] \cdot [(-4) + (-6)] \cdot$ Gate |
| Amount | $(+4) \cdot (-8) \cdot (-5) \cdot$ Gate |
| Routing & Transit | $(-4) \cdot \overline{(+5)} \cdot \overline{(-5)} \cdot (+6) \cdot (-8) \cdot$ Gate |
| Dash | $(-2) \cdot (+3) \cdot (-5) \cdot (-8) \cdot$ Gate |
| 0 | $(-8) \cdot (+7) \cdot (-2) \cdot [\overline{(+6)} \cdot \overline{(-3)}] \cdot$ Gate |
| 8 | $(-8) \cdot (+6) \cdot (-3) \cdot$ Gate |
| 4 | $\overline{(-8)} \cdot (-7) \cdot (+5) \cdot [\overline{(+6)} \cdot \overline{(-2)}] \cdot$ Gate |
| 6 | $\overline{(-8)} \cdot (-7) \cdot (+6) \cdot \overline{(-3)} \cdot [\overline{(+5)} + [(-2) \cdot (+3)]] \cdot$ Gate |
| 9 | $\overline{(-8)} \cdot (-7) \cdot [(-3) + \overline{(+6)}] \cdot [\overline{(+3)} \cdot \overline{(-4)}] \cdot [\overline{(+5)} + [(-2) \cdot (+6)]] \cdot$ Gate |
| 3 | $\overline{(-8)} \cdot \overline{(-7)} \cdot (+2) \cdot (-3) \cdot [\overline{(-2)} \cdot \overline{(+5)}] \cdot [(-6) + \overline{(-5)}] \cdot$ Gate |
| 5 | $\overline{(-8)} \cdot \overline{(-7)} \cdot (-6) \cdot [\overline{(-3)} + [(-2) \cdot [(-2) \cdot (+5)]]] \cdot$ Gate |
| 7 | $\overline{(-8)} \cdot \overline{(-7)} \cdot (+3) \cdot (-4) \cdot [(-6) + \overline{(-5)}] \cdot$ Gate |
| 1 | $\overline{(-8)} \cdot \overline{(-7)} \cdot \overline{(-6)} \cdot (-5) \cdot (+3) \cdot [(-4) + \overline{(-2)} \cdot \overline{(+4)}] \cdot$ Gate |
| 2 | $\overline{(-8)} \cdot \overline{(-7)} \cdot \overline{(-6)} \cdot (-5) \cdot [\overline{(-3)} + [(-2) \cdot (+4)]] \cdot$ Gate |

In Table I, a bar over a designation signifies a "not" signal, i.e., a signal appearing at the terminal 333 of the signal generators 330 and 331. The expression "$(-8) \cdot (+6)$" is the conjunctive or "AND" combination of the individual signals and means "$(-8)$ AND $(+6)$"; i.e., both of these signals $(-8)$ and $(+6)$ are required inputs for the character "8." The expression "$(-6) + \overline{(-5)}$" is the disjunctive or "OR" combination of the individual signals, and means "$(-6)$ OR $\overline{(-5)}$"; i.e., either one of the signals $(-6)$ or $\overline{(-5)}$ is one of the required inputs for the characters "3" and "7." Also, the expression $\overline{(+6) \cdot (-2)}$ signifies $\overline{(+6)} + \overline{(-2)}$ and so is equivalent to $\overline{(+6)}$ OR $\overline{(-2)}$.

Inasmuch as the widths of the characters vary, i.e., individual characters may end at one of the times $t_5$ to $t_8$, and the last signal of every character is negative, "not" signals are included for the times after each character ends, if possible. For example, the final negative pulse for the character "1" occurs at the time $t_5$, and so "not" negative signals are required for the times $t_6$ to $t_8$. Where possible, the greatest magnitude signals of the characteristic wave-shapes are used to identify the characters. Thus the character "4" requires $(+5)$ and $(-7)$ signals, the relatively small $(-3)$ signal not being used. Nevertheless, relatively low amplitude signals have been made optional requirements for some characters. Thus a $(-6)$ has been paired with a $\overline{(-5)}$ for the character "7." In addition, where "not" signals are required, they are usually paired with another signal, so that if noise is present on a document it would require at least two unwanted noise signals to cause the rejection of that check.

For simplicity, only the input terminals for the "0" AND circuit 340 have been connected to the appropriate ones of the signal generators 330 and 331 as required by the logic shown in Table I. Thus the "$\overline{(-3)} + \overline{(+6)}$" input is supplied through an OR circuit 338.

In some instances, one character will be read as two numbers. For example, the character "1" will be read as a "1" and a "2" because of the logic used for a "2." Nevertheless, a "2" cannot be read as a "1," and so if a character is read as both a "1" and a "2" it is a "1," therefore the "2" is disregarded by a technique to be discussed below. Similarly, it is possible that a "7" may be read as a "7" and a "2," a "3" as a "3" and a "2," and a "7" as a "7" and a "5."

It should be noted that the "gate" input is required for every character. Inasmuch as the signal generators 330 and 331 provide inverse outputs, there will always be a "not" signal at the terminal 333 before a signal appears on the complementary terminal 332. Thus the correct digital signals may not be generated by the signal generators 330 and 331 until the time $t_8$, and a false identification might appear at the output of the AND circuits 340 if the inputs to these circuits consisted only of the signals from the signal generators 330 and 331. Therefore, the output of the "2–8" gate 335 is preferably a required input, so that a character-identifying signal is generated by the respective AND circuit 340 only at a time between $t_8$ and $t_9$, this identifying signal disappearing at time $t_9$ (i.e., reset). Alternatively, the "gate" could be omitted for characters which require a $(-8)$ input.

*Field and column selection*

As a document passes under the reading head 187, each character in all four fields is read, and for a period of time after the time $t_8$, but before reset at time $t_9$, the identified character is stored in the bistable multivibrator of the corresponding character-identifying or AND circuit 340. If the sorting apparatus is to be used "On Line," the output terminals 345 of the AND circuits 340 may be connected to suitable buffer units for processing the data on the checks, or the like, inasmuch as the character-identifying signals for every significant character on the check appear on the terminals 345. For the purpose of sorting the checks into the pockets 90, however, only the character-identifying signal for the particular character on which the document is to be sorted may be transferred from the corresponding character-identifying circuits 340.

The desired field to be scanned is determined by a field verification circuit 360 (FIG. 22) in response to a signal from the photoelectric sensor 82. In particular, a negative pulse is applied to the input terminal 361 of the field verification circuit 360 from a spacing and jam detecting circuit 365 (to be discussed below) in response to the sensor 82, the duration of the input pulse equaling the time that a document breaks the beam of light between the lamp in the sensor 82 and the associated photoconductive device. As mentioned above, the sensor 82 is so spaced from the reading head 187 that the leading edge of a check breaks the light beam associated with the sensor 82 at a time just before the field to be scanned reaches the reading head.

The input signals to the field verification circuit 360 may be taken from the sensor 82, if documents are to be sorted with respect to characters appearing in the "On-Us" field; while the sensors 83 and 84, for example, may be employed to sort documents with respect to characters in the "Transit Number" and "Auxiliary On-Us" fields, respectively. The spacing and position of the sensors 82, 83 and 84 may be suitably adjusted along the check transmission path in order to sort properly specific documents from a given drawee bank.

The negative pulse applied at the input terminal 361 is applied to a pair of diodes 370 and 371. The diode 370 and diode 372 comprise an AND circuit which serves to cut off a transistor 373 when each of the diodes 370 and 372 receives a negative pulse, the transistor 373 being cut off due to a suitable bias voltage on a terminal 374. The diode 372 is fed through the switch 86 which selectively couples an output signal from the character reset circuit 312 or one of the "On-Us" and "Transit Number" AND circuits 340. When the transistor 373 is cut off, it sets a bistable multivibrator including a pair of transistors 378 and 379 in a state in which the transistor 379 supplies a positive pulse to a diode 380.

As long as the voltage on the terminal 361 is positive, i.e., when the light beam of the sensor 82 is unbroken, a transistor 387 is conductive and bypasses a capacitor 388. When the negative input signal is received at the terminal 361, however, and before the positive pulse is received at the diode 380, the transistor 387 is cut off by a suitable bias voltage applied to a terminal 390, and the capacitor 388 is charged by a suitable source of current through a pair of resistors 392 and 393. When the potential of the capacitor 388 reaches the threshold level necessary to fire a unijunction transistor 395, a positive pulse is transmitted through a diode 396 to an OR circuit 400 to cause the particular check to be conveyed to the reject pocket 91 as will be discussed below. When the positive pulse is applied to the diode 380 in response to the negative pulse received from the switch 86, the transistor 387 is rendered conductive so as to again bypass the capacitor 388. If a positive pulse is received by the diode 380 within 6 milliseconds, for example, after the charging of the capacitor 388 has begun, the capacitor 388 is bypassed before the unijunction transistor 395 is fired, and no output pulse is sent to the OR circuit 400. The values of the capacitor 388 and the resistors 392 and 393 are appropriately selected to establish this period of 6 milliseconds. If, however, the diode 380 does not receive a positive pulse within the 6 millisecond interval, the OR circuit 400 will be triggered and the check will be rejected.

If a field symbol need not be read, the switch 86 may be positioned to feed output signals from the character reset 312 to the field verification circuit 360. In this case, if a character is not read within 6 milliseconds of the time at which the leading edge of a check breaks the light beam of the sensors 82 (for "On-Us"), 83 (for "Transit Number"), or 84 (for "Auxiliary On-Us"), an output pulse is sent to the OR circuit 400 and the check is rejected. Alternatively, the switch 86 may be connected to the "On-Us" or "Transit Number" AND circuit 340, in which case the appropriate field symbol must be read within 6 milliseconds of the time at which the check breaks the light beam of one of the sensors 82 and 83, or the check will be rejected.

When the first character is read after the negative input pulse is applied to the terminal 361, the bistable multivibrator including the transistors 378 and 379 is switched to a state which provides a negative pulse to the column counter drive trigger circuit 385, the negative pulse lasting until the bistable multivibrator is reset. A second negative pulse is applied to the trigger 385 from the "2–8" gate 335 at the time $t_2$ when each character passes the reading head 187. In response to the two negative input pulses, the trigger 385, which is a conventional AND circuit, drives a 14 stage column counter drive 405. The counter drive 405 in turn drives a conventional 14 stage column counter 406, the outputs of which appear at 14 terminals of a switch 407.

As each character within the selected field is scanned, the output signal from the 14-stage column counter 406 is successively stepped to a different one of the corresponding terminals of the manual operated selector switch 407. The switch 407 selects the specific character within a selected field with respect to which documents are to be sorted. Thus, if checks are to be sorted in response to the 5th digit within the selected field, the switch 407 is correspondingly positioned and when the 5th digit is scanned by the magnetic reading head 187 an output pulse from the column counter 406 will be applied to a column selector drive 410. The column selector drive 410 is a conventional pulse generator which provides the gating pulses for the character gate circuits 415 designated "0" to "9."

The character gate circuits 415 comprise a conventional AND circuit, one input of which is from the column selector drive 410, the other input being from the corresponding AND circuit 340. The output of the AND circuit in a gate circuit 415 sets a conventional bistable multivibrator to a first state, reset being accomplished either by a signal from the OR circuit 400 or by a signal applied to a terminal 417. In addition, some of the gate circuits 415 may be reset through an AND circuit 418 in response to the outputs of any two gate circuits 415 which are energized by a single character. FIG. 17B shows that the "2" gate 415 is reset if an output signal appears on both the "1" and "2" gates 415.

When the significant character in the selected position is scanned, all the character gates 415 are enabled by the column selector drive 410 to transfer the corresponding character identification signal in the corresponding AND circuit 340 to the bistable multivibrator for the respective character gate 415, which in turn provides one input to a conventional AND circuit 420. The bistable multivibrator portion of each character gate 415 is the storage circuit 260 designated in FIG. 2B.

When the leading edge of the check breaks the light beam associated with the sensor 94, a sensor circuit 425 is triggered to provide a second input to the AND circuits 420, whereupon the pocket selection signal stored in the character gate 415 (i.e., in the storage circuit 260 thereof) is transferred along an electrical path to the corresponding pocket gate 92, either directly to the solenoid drive 261 in the case of the "0" pocket or through the successive delay circuits 262 and their corresponding AND circuits 263, as discussed above. The pocket selection signals are transferred from the AND circuits 263 by means of additional sensor circuits 425 in response to the successive sensors 95.

Reset and jam detection

The output of the sensor circuit 425 associated with the AND circuits 420, also drives an output reset circuit 430, which comprises a conventional "one-shot" multivibrator delay circuit followed by a conventional pulse generator. The output pulse from the output reset 430 resets all of the character gates 415 through the OR circuit 400, and also resets the field verification circuit 360 as well as the 14-stage column counter 406 through an OR circuit 435. Thus, as each document is conveyed from the transport section 48 into the pocket section 49, all of the circuits are reset and the apparatus is ready to read a particular character on the next check.

If more than one character identifying signal is generated by the character gates 415 as a result of extraneous noise signals caused by poor printing or magnetic waste particles in the check, all of the character gates 415 are reset by a check circuit 440, so that none of the pocket gates 92 is energized for that particular check, which is then conveyed to the reject pocket 91. The check circuit 440 includes a conventional threshold amplifier which is fed by parallel input networks, the input terminal 441 of each input network being coupled to a corresponding output terminal 442 of the character gates 415.

Each of the input networks includes a source of current and a conventional gate adapted to be energized by an output signal from the corresponding character gate terminal 442. When a given input network is so energized, a capacitor fed in common by all of the parallel inputs is charged through an individual resistor in the specific input circuit, and the circuit constants are so chosen that if two or more input circuits are energized, the capacitor is charged to a voltage level sufficient to switch a tunnel diode, for example, connected across the capacitor, to its high voltage state. When this occurs, the threshold amplifier is triggered and the check circuit 440 resets all of the character gates 415 through the OR circuit 400.

If only one of the parallel input circuits of the check circuit 440 is energized, corresponding to a normal situation in which multiple readings do not occur, the threshold amplifier is not fired and the respective check is sorted into its proper pocket 90. By so charging the capacitor, a small time delay is provided before the threshold amplifier is triggered, permitting a multiple reading to be cleared which is caused as a result of the particular logic arrangement chosen. The check circuit 440 is reset by the output from the output reset 430.

Another reset is accomplished by a check circuit 445, if any one of the character gates 415 provides an output signal for longer than 100 milliseconds. When the drive motors 141 and 180 are turned on, for example, a noise pulse might set the "flip-flop" of a character gate 415. Each of the input terminals 446 of the check circuit 445 is connected to a different one of the terminals 442 of the character gates 415. If any one of the input terminals 446 of the check circuit 445 is energized, a suitable timing circuit is triggered which provides an output pulse after a delay of about 100 milliseconds, the output pulse resetting the character AND gates 415 through the OR circuit 400. A circuit similar to the one including the transistors 387 and 395, and the capacitor 388 in the field verification circuit 360 might be employed in the check circuit 445, for example.

Reset is also accomplished when power is first turned on by means of an initial reset circuit 450 which drives the output reset 430. The initial reset 450 includes a conventional delay circuit which drives a conventional pulse generator, so that all bistable elements are reset, for example, approximately 270 milliseconds after power is turned on. In addition, the eight and fourteen stage counters 302 and 406, respectively, are preset before each character reaches the reading head 187 by the spacing and jam detector circuit 365 in response to the sensor 63.

The spacing between successive checks and the speed of each check are monitored by the spacing and jam detector circuit 365 (FIG. 24). When a check breaks the light beam of the sensor 82, the associated photoconductive device 460, which preferably has a rapid response time and may be a germanium photodiode, for example, causes the voltage at the emitter of a transistor 461 to drop, thereby cutting off a transistor 463 which normally bypasses a capacitor 464, whereupon the capacitor 464 is charged through a resistor 465 by a suitable source of direct current. The values of the resistor 465 and the capacitor 464 are so chosen that a jam detector relay drive circuit 470 will be energized through a diode 466 if the capacitor 464 is not bypassed again within a certain predetermined time, this time being a measure of the minimum speed of a document past the sensor 82 which may be determined from the length of that check.

When the next successive check crosses the light beam of the sensor 63, the associated photodiode 475 will cut-off a transistor 476, so that an emitter follower circuit including a transistor 477 charges a capacitor 478 through a diode 479 and a resistor 480 and turns on a tunnel diode 481 which fires a transistor 482 very quickly, the values of the capacitor 478 and the resistor 480 being selected so that the capacitor 478 is rapidly charged. If there should be a hole in the check crossing the light beam of the sensor 63, the transistor 476 will be turned on and off, but the operation of the spacing and jam detector circuit 365 will not be disturbed because the capacitor 478 keeps the tunnel diode 481 and the transistor 482 energized for a relatively long time. This long time period is determined by the values of the capacitor 478, the resistor 480 and a resistor 483, the diode 479 preventing the discharge of the capacitor 478 through the emitter follower circuit including the transistor 477. A capacitor 484 connected across the tunnel diode 481 serves as a noise filter to prevent the tunnel diode 481 from being inadvertently triggered.

Energization of the transistor 482 cuts off a transistor 486 which normally bypasses a capacitor 487. This capacitor 487 is then charged through a resistor 488 and will trigger the jam relay drive circuit 470 through a diode 489 if the speed of the second check does not exceed the predetermined minimum value. The positive pulse at the collector of the transistor 486 is differentiated by a capacitor 492 and a resistor 493, the differentiated signal energizing a transistor 495 which provides the preset signals to the eight and fourteen stage counters 302 and 406, respectively, through a diode 496. The hole blanking feature provided by the capacitor 478 and the resistors 480 and 483 prevents the eight and fourteen stage counters 302 and 406 from being preset at the wrong times. The negative pulses from the collector of the transistor 495 are also applied to a diode 500 which comprises an AND circuit in conjunction with a diode 501. The potential of the emitter of the transistor 461 is relatively high when no check breaks the beam of the sensor 82, but as long as a check is beneath the sensor 82 the emitter of the transistor 461 is at ground potential.

Thus if the first check is beneath the sensor 82 when the leading edge of the second check breaks the light beam of the sensor 63, the inputs to both diodes 500 and 501 will be low and a transistor 502 will be cut-off thereby transmitting a positive pulse through a diode 503 to the jam relay drive circuit 470. It is necessary to provide a differentiated signal to the diode 500 in order to represent the leading edge of the second check, so that the jam detection circuitry will be operated if checks are being sorted having a length greater than the distance between the sensors 63 and 82. The sensors 63 and 82 may be mutually spaced by seven and three-quarter inches, for example, so that if successive checks are spaced less than seven and three-quarter inches, indicating an excessive feed rate, the jam detector relay drive 470 will be triggered.

The jam detector relay drive circuit 470 is a conventional pulse generator which provides an output pulse of sufficient magnitude and duration to energize a relay (not shown) which causes the drive motor 141 and the synchronous motor 180 to stop. Conventional electrical braking is employed to stop these motors, simultaneously disconnecting the energizing circuitry therefor and grounding the field coils through an appropriate capacitor.

The sensor circuits 425 (FIG. 23) responsive to the sensors 94 and 95 drive the jam detector relay circuit 470 from an output terminal 510 in the same way that the relay drive 470 is driven in response to the sensor 63 (FIG. 24), and so the same reference numerals are applied to corresponding circuit elements, primes being added in FIG. 23. In addition, the sensor circuits 425 drive the AND circuits 263 and 420 through an output terminal 511, the output pulse having a duration determined by the values of a resistor 512 and a capacitor 513. If there is a hole in a check crossing the light beams of the sensors 94 and 95, false triggering of the AND circuits 263 and 420 is prevented by the hole blanking circuitry including the capacitor 478' and the resistors 480' and 483'. Furthermore, the AND circuits 263 and 420 transfer the pocket selection signal as soon as the output pulse is generated at the terminal 511, i.e. as soon as the leading edge of a check is detected. The trailing edge of a check, which may be under another sensor at the "wrong" time, will not cause a pocket selection signal to be prematurely transferred, because the output pulse from the terminal 511 is of very short duration, e.g. of several microseconds, so that the AND circuits 263 and 420 are only enabled for this short interval.

All of the sensors 94 and 95 are thus used for jam protection as well as for transferring the pocket selection signals between successive delay stages 262. In addition, the sensor 94 not only accomplishes both of these functions but also transfers the pocket selection signals from the storage 260. Similarly, the sensors 63 and 82 provide two types of jam protection, namely monitoring of the spacing between successive checks as well as the minimum speed of each check.

Thus there is provided novel and improved apparatus and methods in accordance with the invention, for sorting checks or other documents, in accordance with at least one magnetizable and detectable character within a selected field on each such document, by determining the polarity of the characteristic analog signal derived from the selected character at predetermined successive time intervals from the beginning of the analog signal, and generating digital signals indicative of the presence and absence of analog signals having specific polarities at the predetermined time periods. Combinations of these digital signals corresponding to predetermined digital characters are utilized to generate a pocket selection signal for the derived digital character which is transferred from a storage means to one or more successive delay and storage circuits, when the document passes a predetermined position along the document transmission path, the pocket selection signal being transferred between adjacent delay and storage circuits in accordance with the progress of the particular document and then applied to a selected pocket gate to guide that document into the corresponding pocket.

It will be understood by those skilled in the art that the above-described exemplary embodiments are susceptible of variation and modification without departing from the spirit and scope of the invention. For example, the present sorting apparatus may be readily adapted to sort documents bearing magnetic ink characters of other shapes, such as the bar code system of the CMC-7 type font, by suitably arranging the logic matrix to require appropriate combinations of digital signals to represent each character. In this regard, the logic matrix may be fabricated in the form of a plugboard in order to facilitate arranging an appropriate logic for each system of characters to be read. Any suitable technique of transduction which generates analog waveforms characteristic of detectable characters may be used with the circuitry disclosed herein to read the characters. The analog-to-digital conversion technique of this invention thus offers wide applications for this sorting apparatus. In addition, portions of the circuitry disclosed herein may be used for analog-to-digital conversion generally. Therefore, the invention is not deemed to be limited except as defined by the appended claims.

We claim:

1. A method for sorting documents in accordance with detectable characters on each document, comprising the steps of feeding the documents to a character reader, reading at least one detectable character on each document, generating a pocket selection signal representative of a character on each document, delaying the pocket selection signal in accordance with the transit time of a document between the character reader and a selected one of a plurality of pockets into which that document is to be sorted, conveying the document from the character reader to the selected pocket, detecting the presence of the document at a predetermined position between the character reader and the selected pocket, and energizing a pocket gate in response to the delayed pocket selection signal and to the presence of the document at the predetermined position so as to guide the document into the desired pocket.

2. In apparatus for sorting documents in accordance with detectable characters on each document including transducer means for generating analog electrical signals of variable polarity in response to and representative of each character exposed thereto, means for feeding the documents along a path to said transducer means so as to expose each character thereto, a plurality of pockets adapted to receive the sorted documents, means for conveying the documents from said transducer means along the path past the entrance of said pockets, a plurality of pocket gates each of which is adapted to be actuated by a corresponding pocket selection signal to guide a document from the path into a different one of said pockets in accordance with at least one character on the document, the combination therewith of means for successively sampling each such analog signal at a plurality of predetermined different times with respect to the beginning thereof, means responsive to said sampling means for generating digital signals representative of the polarity of the analog signal at the predetermined times, and means responsive to the digital signals for generating the pocket selection signal.

3. The combination as claimed in claim 2, wherein the detectable characters are magnetizable characters and said transducer means comprises a reading head, and including a magnetizing head, each document being passed by and in cooperative relation with said magnetizing and reading heads, first roller means having a relatively rigid, knurled document-engaging surface, second roller means having a relatively resilient document-engaging surface, the document-engaging surface of said first roller means adapted to engage the document-engaging surface of said second roller means, said first and second roller means fixedly gripping and controlling the position of a document adapted to be passed therebetween while the document is passing in cooperative relation with the magnetizing and reading heads, and means for rotating said first and second roller means.

4. The combination as claimed in claim 2, including first resilient means for urging a document passing by said magnetizing head into contact therewith.

5. The combination as claimed in claim 2, including second resilient means for urging a document passing by said reading head into contact therewith.

6. The combination as claimed in claim 2, including first photoelectric means along the path for detecting the presence of a document, second photoelectric means along the path in spaced relation to said first photoelectric means for detecting the presence of a document, means responsive to said first and second photoelectric means for determining whether the spacing between successive documents is less than a predetermined minimum value, and means responsive to said minimum spacing determining means for disabling said feeding means and said conveying means.

7. Apparatus as claimed in claim 6, wherein said minimum spacing determining means includes first means responsive to said first photoelectric means for generating a pulse the duration of which equals the time a document is in operative relation to said first photoelectric means, second means responsive to said second photoelectric means for generating a pulse the duration of which equals the time a document is in operative relation to said second photoelectric means, and means responsive to said first and second pulse generating means for generating a signal the duration of which coincides with the period during which the pulses from said first and second pulse generating means are mutually coincident.

8. Apparatus as claimed in claim 7, including means for differentiating the pulse generated by said first pulse generating means, the documents traveling in a direction from said first photoelectric means to said second photoelectric means.

9. The combination as claimed in claim 2, including apparatus for simultaneously shaping positive and negative pulses of each analog signal at the output terminal said transducer means and a common reference point to generate corresponding pulses at the input terminal of said sampling means of relatively shorter duration having leading edges which substantially coincide in time with leading edges of the corresponding analog signal pulses and for preventing noise below a predetermined level from being transmitted to the input terminal, comprising first diode means and a first resistance means coupled serially between the input and output terminals, said first diode means being adapted to pass positive pulses, first capacitance means connected in parallel relation with said first resistance means, second diode means and second resistance means coupled serially between the input and output terminals, said second diode means being adapted to pass negative pulses, second capacitance means connected in parallel relation with said second resistance means, and third resistance means connected between the input terminal and the common reference point.

10. The combination as claimed in claim 2, wherein said feeding means feeds a single document from a plurality of documents arranged in a stack and comprises means for extracting at least one document from the stack of documents, first roller means, second roller means in cooperative relation to said first roller means, said first and second roller means having document engaging surfaces, said extracting means being adapted to feed at least one document between said first and second roller means, and means for rotating said first roller means in a direction for driving a document fed by said extracting means between said first and second roller means and for rotating said second roller means in a direction tending to prevent a document fed by said extracting means from passing between said first and second roller means.

11. Apparatus as claimed in claim 10, including means for driving the stack into operative relationship with said extracting means.

12. Apparatus as claimed in claim 10, including metering plate means disposed between the stack of documents and said first and second roller means for preventing all but the outermost documents in the stack from being extracted by said extracting means.

13. Apparatus as claimed in claim 10, wherein the speed of the document-engaging surface of said first roller means exceeds the speed of the document-engaging surface of said second roller means.

14. Apparatus as claimed in claim 10, wherein said extracting means includes third roller means having at least one document-engaging surface, and means for rotating said third roller means, the speeds of the document-engaging surfaces of said first and third roller means being substantially the same.

15. Apparatus as claimed in claim 14, including means for pulling a document driven between said first and second roller means therefrom, said pulling means being so spaced from said third roller means that said pulling means grasps a given document before that document is released by said third roller means.

16. Apparatus as claimed in claim 10, wherein the coefficient of friction of the document-engaging surface of said first roller means exceeds the coefficient of friction of the document-engaging surface of said second roller means.

17. Apparatus as claimed in claim 10, wherein the durometer of the document-engaging surface of said second roller means exceeds the durometer of the document-engaging surface of said first roller means.

18. Apparatus as claimed in claim 17, wherein said first and second roller means have mutually spaced axes of rotation spaced apart a distance such that said first and second roller means cooperatively engage documents having thicknesses within a given range at a predetermined zone of contact to insure that a document fed thereto is securely gripped thereby.

19. Apparatus as claimed in claim 18, including means for urging a document fed by said extracting means into contact with said document-engaging surface of said first roller means along a line substantially parallel with a line in the zone of contact substantially perpendicular to the line of travel of a document between said first and second roller means.

20. Apparatus as claimed in claim 10, including means for guiding documents fed by said extracting means into contact with said first roller means.

21. Apparatus as claimed in claim 10, wherein said first and second roller means have substantially cylindrical document-engaging surfaces.

22. Apparatus as claimed in claim 10, wherein each of said first and second roller means includes a plurality of spaced-apart, coaxial, document-engaging surfaces.

23. Apparatus as claimed in claim 22, wherein each document-engaging surface of one of said first and second roller means is adapted to grip a document in conjunction with a corresponding document-engaging surface of the other of said first and second roller means, said corresponding document-engaging surfaces being mutually aligned.

24. Apparatus as claimed in claim 22, including means disposed between said spaced-apart document-engaging surfaces of said first roller means for urging documents fed by said extracting means into contact with said document-engaging surfaces of said first roller means.

25. Apparatus as claimed in claim 24 wherein said urging means includes at least one spring-biased finger.

26. Apparatus as claimed in claim 24, wherein said document-engaging surfaces of said first roller means engage said document-engaging surfaces of said second roller means in a plurality of contact zones, and said urging means is so disposed that a document fed by said extracting means contacts said document-engaging surfaces of said first roller means along a line substantially parallel to a line which connects the plurality of contact zones and which is substantially perpendicular of the direction of travel of a document between said first and second roller means.

27. Apparatus as claimed in claim 10, including means for positively extracting a document from between said first and second roller means.

28. The combination as claimed in claim 2, including apparatus for spacing consecutive documents fed to said transducer means, comprising first roller means, second roller means in cooperative relation with said first roller means, said first and second roller means turning in directions to drive therebetween a document fed thereto, the document-engaging surfaces of said first and second roller means traveling at a first speed, and wherein said feeding means feeds a single document from a stack of documents to said first and second roller means at a second speed, the second speed being less than the first speed.

29. The combination as claimed in claim 2, including apparatus for simultaneously conveying each document to said transducer means in a given direction of travel at a desired speed while one edge of the document is aligned parallel to the given direction of travel, comprising registration plate means parallel to the given direction of travel and substantially perpendicular to the plane in which the document is conveyed, first roller means having an axis disposed substantially parallel to the plane of a document being conveyed and at an acute angle from a line perpendicular to said registration plate means, said first roller means turning at such velocity that the ratio of the speed of the document-engaging surface thereof to the desired speed equals the secant of the acute angle and the one edge of the document is driven against said registration plate means while the document is conveyed in the given direction of travel, and second roller means in cooperative relation to said first roller means.

30. Apparatus as claimed in claim 29, wherein said feeding means feeds the document to said first roller means at a speed less than the desired speed in order to space successive documents.

31. The combination as claimed in claim 2, wherein the documents are to be conveyed along a path interposed between a first conveying section operative at a first speed to a second conveying section operative at a second speed, the second speed being less than the first speed, including document-engaging transport means operative at a speed greater than the second speed for conveying a document from the first conveying section to the second conveying section, means for urging the document into engagement with said transport means, and means for facilitating slipping engagement between said transport means and the document when a portion of the document is engaged by the second conveying section.

32. The combination as claimed in claim 31, wherein said transport means includes at least one elongated tape means disposed along the path between the first and second conveying sections and in underlying relation to the document, said tape being composed of material adapted to promote sliding engagement with the document when the document is in engagement with the second conveying section.

33. The combination as claimed in claim 2, including apparatus for simultaneously shaping positive and negative pulses of each analog signal at the output terminal of said transducer means and a common reference point to generate corresponding pulses at the input terminal of said sampling means of relatively shorter duration having leading edges which substantially coincide in time with the leading edges of the corresponding analog signal pulses and for preventing noise below a predetermined level from being transmitted to the input terminal, comprising first diode means and a first resistance means connected serially between the output terminal and one end of a potentiometer, said first diode means being adapted to pass positive pulses, first capacitance means connected in parallel relation with said first resistance means, second diode means and second resistance means connected serially between the output terminal and another end of said potentiometer, said second diode means being adapted to pass negative pulses, second capacitance means connected in parallel relation with said second resistance means, the variable tap of said potentiometer being connected to the input terminal, and third resistance means connected between the input terminal and the common reference point.

34. Apparatus for sorting documents in accordance with detectable significant characters thereon, comprising transducer means for generating an analog electrical signal in response to and representative of each character exposed thereto, means responsive to said transducer means for generating a pocket selection signal in accordance with at least one significant character on each document, means for feeding one document from a stack of documents to said transducer means so as to expose the characters on the one document thereto, a plurality of pockets for receiving documents, each of said pockets adapted to selectively receive a document having a corresponding significant character, means for conveying the documents from said transducer means along a path past each of said significant character pockets, a plurality of selectively energizable pocket gates each of which is adapted to be actuated by a pocket gate energizing signal to guide a document from the path into a corresponding significant character pocket, means for delaying the pocket selection signal in accordance with the transit time of a document between said transducer means and the corresponding pocket, photoelectric means along the path associated with said significant character pockets for detecting the presence of a document at at least one selected point therealong, and means responsive to said photoelectric means and to said pocket selection signal delaying means for generating a pocket gate energizing signal to energize a selected one of said plurality of pocket gates.

35. Apparatus for sorting documents in accordance with detectable significant characters on the documents, comprising transducer means for generating an analog electrical signal in response to and representative of each character exposed thereto, means responsive to said transducer means for generating a pocket selection signal in accordance with at least one significant character on each document, means for feeding one document from a stack of documents to said transducer means so as to expose the characters on the one document thereto, a plurality of pockets for receiving documents, each of said pockets adapted to selectively receive a document having a corresponding significant character, means for conveying the documents from said transducer means along a path past each of said significant character pockets, a plurality of selectively energizable pocket gates each of which is adapted to be actuated to guide a document from the path into a corresponding significant character pocket, at least some of said pocket gates being actuated by the pocket gate energizing signal and the others of said pocket gates being actuated by the delayed pocket selection signal, means for delaying the pocket selection signal in accordance with the transit time of a document between said transducer means and the corresponding pocket, photoelectric means along the path associated with at least some of said significant character pockets for detecting the presence of a document at at least one selected point therealong, and means responsive to said photoelectric means and to said pocket selection signal delaying means for generating pocket gate energizing signals to energize a selected one of said plurality of pocket gates.

36. Apparatus as claimed in claim 35, including a reject pocket for receiving documents not guided into one of said significant character pockets.

37. Apparatus as claimed in claim 35, wherein said pocket selection signal delaying means corresponding with at least one of said pocket gates and actuated by a pocket gate energizing signal includes a plurality of successive time delay circuits, all but one of said successive time delay circuits being responsive to the next preceding time delay circuit and to a different one of said photoelectric means.

38. Apparatus for sorting documents in accordance with a selected one or more of a plurality of detectable characters on each document, comprising means for reading the characters exposed thereto, means for feeding the documents to said reading means so as to expose the characters thereto, means responsive to said reading means for generating a pocket selection signal in accordance with the selected character on each document, means for storing the pocket selection signal, a plurality of pockets for receiving documents, each of said pockets adapted to receive documents having a corresponding selected character, means for conveying the documents from said reading means along a path past each of said pockets, a plurality of pocket gates each of which is adapted to be actuated to guide a document from the path into a corresponding one of said pockets, gate control means including means for actuating said pocket gases, first photoelectric means along the path for detecting the presence of a document after the characters thereon have been read by said reading means, and means responsive to said first photoelectric means for transferring the pocket selection signal from said storing means to said gate control means.

39. Apparatus as claimed in claim 38, including means responsive to said transferring means for delaying the pocket selection signal in accordance with the transit time of a document between said storing means and the corresponding pocket gate.

40. Apparatus as claimed in claim 39, including second photoelectric means associated with respective ones of said pockets along the path for detecting the presence of a document, and means responsive to said second photoelectric means and to said delaying means for energizing said pocket gate actuating means.

41. Apparatus as claimed in claim 40, including timing means responsive to at least one of said first and second photoelectric means for determining the speed at which each document passes said photoelectric means, and means responsive to said speed determining means for disabling said feeding means and said conveying means.

42. Apparatus as claimed in claim 39, wherein said delaying means includes a plurality of successive time delay circuits, and a plurality of photoelectric means associated with respective ones of said pockets along the path for detecting the presence of a document, each of said photoelectric means being associated with a different one of said time delay circuits, said pocket gate actuating means being responsive to the preceding time delay circuit and a respective one of said photoelectric means, all but one of said successive time delay circuits being responsive to the preceding time delay circuit and its associated photoelectric means, the remaining one of said successive time delay circuits being responsive to said transferring means.

43. Apparatus for sorting documents in accordance with at least one of a plurality of detectable characters on each document, comprising a plurality of pockets adapted to selectively receive the documents, means for reading the characters on each document, means for feeding the documents to said reading means, means for conveying the documents from said reading means along a path directed past each of said pockets, means responsive to said reading means for guiding a document into one of said pockets in accordance with one character read, first photoelectric means along the path between said reading means and said pockets for detecting the presence of a document, means responsive to said first photoelectric means and to said reading means for counting at least some of the characters on each document, switch means coupled to said counting means for selecting one character on each document, means responsive to said reading means for generating an electrical signal representative of each character read, means for energizing said guiding means, and means responsive to said switch means for transferring the electrical signal corresponding to the selected character to said energizing means.

44. Apparatus as claimed in claim 43, including second photoelectric means positioned between said feeding means and said reading means for detecting the presence of a document, and means responsive to said second photoelectric means for setting said counting means before each document reaches said reading means.

45. Apparatus as claimed in claim 43, including means responsive to said first photoelectric means and to said reading means for determining whether a character is read within a predetermined time interval after the presence of a document is detected by said first photoelectric means.

46. Apparatus as claimed in claim 45, including means responsive to said time interval determining means for guiding a document into a particular one of said pockets in the event no character is read within the predetermined time interval.

47. Apparatus for sorting documents in accordance with detectable significant characters thereon, comprising a plurality of pockets adapted to selectively receive the documents, said pockets being adapted to receive a document having a corresponding significant character, means for reading at least one significant character on each document, means responsive to said reading means for generating a pocket selection signal in accordance with the significant character read, means for conveying the documents from said reading means along a path directed past each of said significant character pockets, a plurality of electromagnets disposed along the path, a different one of said electromagnets associated with each of said significant character pockets, each of said electromagnets adapted to be energized by a respective pocket selection signal, and a plurality of leaf springs of magnetizable material disposed along the path, a different one of said leaf springs in flux linking relation with each of said electromagnets, each of said leaf springs being biased to a first position to permit documents to pass thereby and being displaced from said first position when the corresponding one of said electromagnets is energized to guide a document from the path into the corresponding one of said pockets.

48. Apparatus as claimed in claim 47, wherein each of said leaf springs is formed with a portion projecting in a direction coincident with the path to guide a document passing a corresponding one of said pockets along the path toward a subsequent one of said pockets.

49. Apparatus for sorting documents in accordance with at least one of a plurality of detectable characters on each document, comprising a plurality of pockets having an entrance and pocket defining walls adapted to selectively receive the documents, means for reading the characters on each document, means for feeding the documents to said reading means, means for conveying the documents from said reading means along a path directed past each of said pockets, means responsive to said reading means for guiding a document into a selected one of said pockets in accordance with at least one character read thereon, means at said pocket entrance for transversely flexing a document entering said pocket about an axis substantially parallel with the direction of travel of the document into said pocket, and means for deflecting the trailing edge of the entering document in stacked relation against said pocket wall on which documents are to be stacked when the entering document is free of said flexing means.

50. Apparatus as claimed in claim 49, including means for retaining the trailing edges of the documents delivered to said pocket in stacked relation against said pocket wall.

51. Apparatus as claimed in claim 50, including means for retaining the leading edges of the documents delivered to said pocket in stacked relation against said pocket wall.

52. Apparatus as claimed in claim 51, including means responsive to said leading edge retaining means for disabling said feeding means and energizing an alarm when a predetermined number of documents are stacked in said pocket.

53. Apparatus for sorting documents in accordance with at least one of a plurality of detectable characters on each document, comprising transducer means for generating an analog electrical signal in response to and representative of each character exposed thereto, means for feeding a single document from a plurality of documents arranged in a stack, means for spacing consecutive documents fed from said feeding means, means for simultaneously conveying a document from said spacing means to said transducer means to expose each character thereto and for aligning one edge of the document parallel to the direction of travel, means for sampling the analog electrical signal at predetermined times relative to the beginning thereof, means responsive to said sampling means for generating digital signals in response to the presence of the analog signal at levels exceeding predetermined threshold levels at the predetermined times, means responsive to the digital signals for generating a pocket selection signal representative of at least one of said characters on each document, means for storing the pocket selection signal, a plurality of pockets for selectively receiving the documents, each of said pockets adapted to receive documents having a corresponding character in a selected position, means for conveying the documents from said transducer means along a path directed past each of said pockets, a plurality of pocket gates each of which is adapted to be actuated to guide a document from the path into a different one of said pockets, means for actuating said pocket gates, first photoelectric means along the path for detecting the presence of a document after all the characters thereon have passed said transducer means, means responsive to said first photoelectric means for releasing the pocket selection signal from said storing means, means responsive to said releasing means for delaying the pocket selection signal in accordance with the transit time of a document between said storing means and the corresponding pocket gate, second photoelectric means positioned along the path for detecting the presence of a document at positions associated with respective ones of said pockets, means responsive to said second photoelectric means and to said delaying means for selectively energizing said pocket gate actuating means, electrical circuitry including at least one of said first and second photoelectric means for determining whether the documents passing thereby travel at a speed less than a predetermined minimum value, electrical circuitry including two of said first and second photoelectric means for determining whether the spacing between consecutive documents is less than a predetermined minimum value, and means responsive to said minimum speed determining circuitry and to said minimum spacing determining circuitry for disabling said feeding means, spacing means, conveying and aligning means, and conveying means.

References Cited

UNITED STATES PATENTS

| | | | |
|---|---|---|---|
| 3,008,576 | 11/1961 | Hanson et al. | 209—74 |
| 3,087,612 | 4/1963 | Duncan et al. | 209—111.7 X |
| 3,097,745 | 7/1963 | Leo | 209—111.8 |
| 3,108,694 | 10/1963 | Crain et al. | 209—111.8 |

ALLEN N. KNOWLES, *Primary Examiner.*

UNITED STATES PATENT OFFICE
CERTIFICATE OF CORRECTION

Patent No. 3,363,756                  January 16, 1968

David E. Dykaar et al.

It is hereby certified that error appears in the above numbered patent requiring correction and that the said Letters Patent should read as corrected below.

Column 1, line 15, for "of" read -- to --; column 13, line 36, after "187" insert -- will be transmitted to the diode 286, charging the capaci- --; line 56, for "change" read -- charge --; column 18, line 32, after "gate" insert -- input --; column 24, lines 35 and 38, for the claim reference numeral "2", each occurrence, read -- 3 --; line 73, after "terminal" insert -- of --; column 25, line 2, after "with" insert -- the --.

Signed and sealed this 22nd day of April 1969.

(SEAL)
Attest:

Edward M. Fletcher, Jr.
Attesting Officer

EDWARD J. BRENNER
Commissioner of Patents